(12) United States Patent
Russell et al.

(10) Patent No.: US 9,559,908 B2
(45) Date of Patent: Jan. 31, 2017

(54) LOCKOUT PREVENTION SYSTEM

(71) Applicant: Dell Products L.P., Round Rock, TX (US)

(72) Inventors: Deborah C. Russell, Austin, TX (US); Andrew Berry, Austin, TX (US); Kevin Eugene Davis, Cibolo, TX (US); Patricia Tims Stone, Austin, TX (US); Matthew Bryan Gilbert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 14/554,986

(22) Filed: Nov. 26, 2014

(65) Prior Publication Data

US 2015/0295931 A1   Oct. 15, 2015

Related U.S. Application Data

(60) Provisional application No. 14/249,173, filed on Apr. 9, 2014.

(51) Int. Cl.
| | |
|---|---|
| G06F 9/24 | (2006.01) |
| G06F 15/177 | (2006.01) |
| H04L 12/24 | (2006.01) |
| G06F 11/07 | (2006.01) |
| H04L 29/14 | (2006.01) |
| G06F 21/57 | (2013.01) |
| H04L 29/06 | (2006.01) |
| H04L 29/08 | (2006.01) |
| G06F 11/32 | (2006.01) |

(52) U.S. Cl.
CPC ........ H04L 41/0823 (2013.01); H04L 63/101 (2013.01); *G06F 11/0766* (2013.01); *G06F 11/0769* (2013.01); *G06F 11/327* (2013.01); *G06F 21/57* (2013.01); *H04L 63/20* (2013.01); *H04L 67/36* (2013.01); *H04L 69/40* (2013.01)

(58) Field of Classification Search
CPC . G06F 11/327; G06F 11/0766; G06F 11/0769; H04L 67/36; H04L 41/0823; H04L 63/20; H04L 69/40
USPC ................................................. 713/1, 2, 100
See application file for complete search history.

(56) References Cited

U.S. PATENT DOCUMENTS

| | | | |
|---|---|---|---|
| 2008/0037528 A1* | 2/2008 | Lindeijer | H04L 41/082 370/354 |
| 2010/0278049 A1* | 11/2010 | Meloche | H04L 12/2697 370/242 |

* cited by examiner

*Primary Examiner* — Michael J Brown
(74) *Attorney, Agent, or Firm* — Haynes and Boone, LLP

(57) ABSTRACT

A lockout prevention system includes a management Information Handling System (IHS) that is coupled through a network to network interface on a networking device. The networking device receives a configuration instruction through the network interface from the management IHS. The networking device then determines that the application of the configuration instruction will inhibit the communication between the management IHS and the networking device through the network interface. The networking device then provide a warning message for display on the management IHS in response to determining that the application of the configuration instruction will inhibit the communication between the management IHS and the networking device through the network interface.

20 Claims, 17 Drawing Sheets

LOCKOUT PREVENTION SYSTEM

CROSS REFERENCE TO RELATED APPLICATIONS

This application is a continuation-in-part application of U.S. patent application Ser. No. 14/249,173, filed on Apr. 9, 2014, the entire disclosure of which is incorporated herein by reference.

BACKGROUND

The present disclosure relates generally to information handling systems, and more particularly to a lockout prevention system for use in information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, networking devices (e.g., switch devices, router devices, etc.), are configurable with, for example, access control lists that include rules that may be applied to interfaces associated with the networking device (e.g., port numbers, Internet Protocol (IP) addresses, etc.) and that define the entities (e.g., user IHSs, networks, etc.) that are permitted to access the networking device through those interfaces. However, the use of access control lists can raise a number of issues. For example, it is possible (and relatively common) for a network administrator to "lock" their administrator IHS out of accessing a networking device when configuring an access control list on that networking device. Typically, this occurs when the network administrator applies an access control list to the networking device that includes an interface that their administrator IHS is using to access the networking device without realizing that the access control list does not permit their administrator IHS to access the networking device through that interface. Once that access control list is applied to the networking device, that networking device must then be rebooted or reset in order to allow the network administrator to use their administrator IHS to access the networking device. Because such networking devices are typically physically remote from the network administrator, that network administrator typically must then contact another administrator or user to reboot the networking device such that their administrator IHS can access it. Such relatively common mistakes involved in the application of access control lists result in wasted time, losses in productivity, and embarrassment for the network administrator.

Accordingly, it would be desirable to provide a lockout prevention system.

SUMMARY

According to one embodiment, an information handling system (IHS), comprising: a communication port; a processing system that is coupled to the communication port; a memory system that is coupled to the processing system and that includes instruction that, when executed by the processing system, cause the processing system to provide a lockout prevention engine that is configured to: receive a configuration instruction through the communication port from a management IHS; determine that the application of the configuration instruction will inhibit communications from the management IHS and through the communication port; and provide a warning message for display on the management IHS in response to determining that the application of the configuration instruction will inhibit communications from the management IHS and through the communication port.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
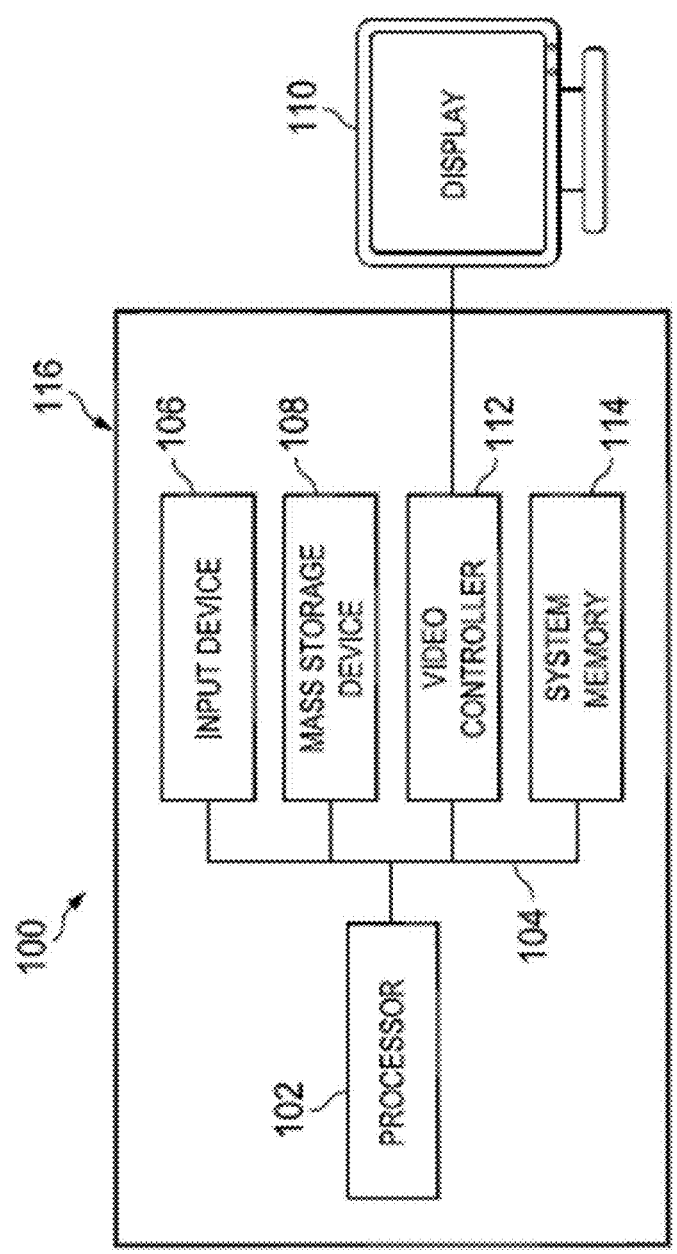
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
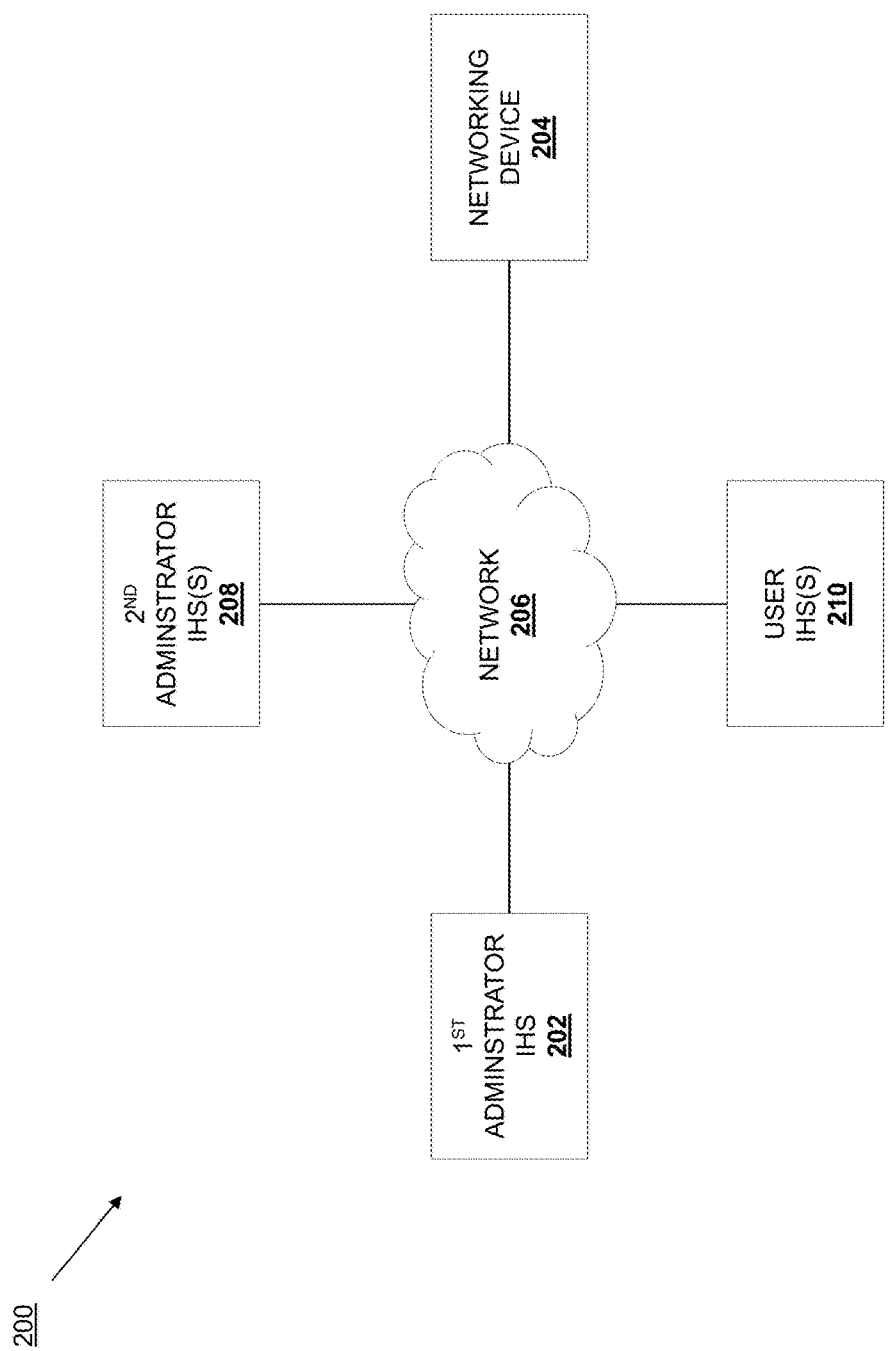
FIG. 2 is a schematic view illustrating an embodiment of an access control list lockout prevention system.

Referring now to FIG. 2, an embodiment of an access control list lockout prevention system 200 is illustrated. The access control list lockout prevention system 200 includes a first administrator IHS 202, which may be the IHS 100 discussed above with reference to FIG. 1 and/or include some or all of the components of the IHS 100, that is communicatively coupled to a networking device 204 through a network 206 (e.g., a Local Area Network (LAN), the Internet, and/or a variety of other networks known in the art). In an embodiment, the networking device 204 may be the IHS 100 discussed above with reference to FIG. 1 and/or include some or all of the components of the IHS 100, and in specific embodiments may include a switch IHS, a router IHS, and/or a variety of other layer 3 networking IHSs known in the art. In some embodiments, one or more second administrator IHSs 208, each of which may be the IHS 100 discussed above with reference to FIG. 1 and/or include some or all of the components of the IHS 100, are communicatively coupled to the networking device 204 through the network 206. Furthermore, in some embodiments, one or more user IHSs 210, each of which may be the IHS 100 discussed above with reference to FIG. 1 and/or include some or all of the components of the IHS 100, are communicatively coupled to the networking device 204 through the network 206.

While in the embodiments discussed below, the access control list lockout prevention system 200 is discussed as operating to prevent lockouts of the first administrator IHS 202 or the one or more second administrator IHSs 208 that may be providing data traffic that terminates on the networking device 204 (e.g., configuration data traffic for the networking device 204) during the provision of access control list instructions and/or access control lists, one of skill in the art in possession of the present disclosure will recognize that the access control list lockout prevention system 200 may be beneficial to prevent lockouts of any system that may provide data traffic handled by the networking device 204, including administrator IHSs 202 and 208, user IHSs 210, and/or other IHSs known in the art. As such, the prevention of the lockout of administrator IHSs 202 and/or 208 providing configuration data traffic to the networking device 204 is simply provided below as an example of the operation of the access control list lockout prevention system 200, and the prevention of the lockout of other types of IHSs providing other types of data traffic to other types of devices is envisioned as falling within the scope of the present disclosure.

Figure 3:
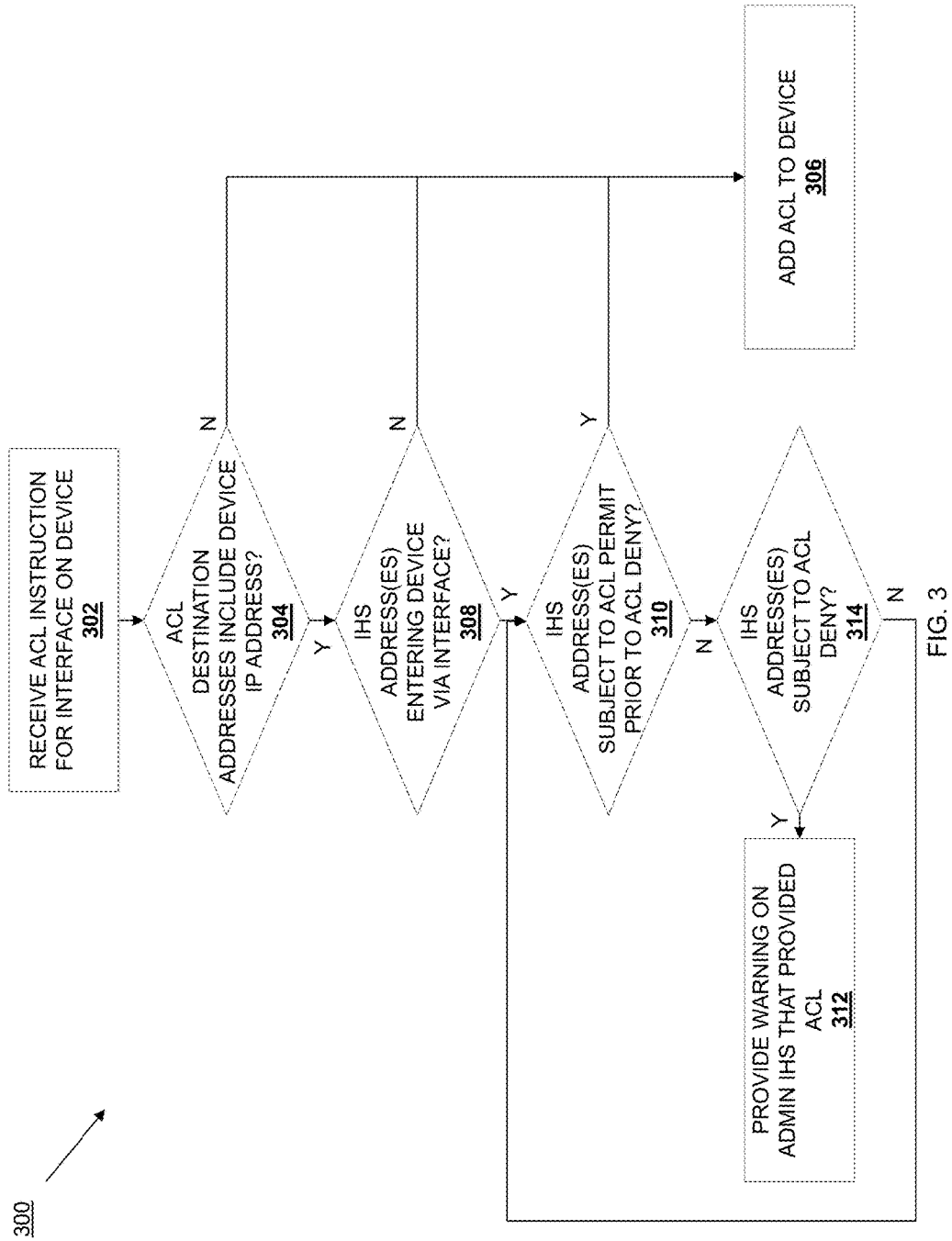
FIG. 3 is a flow chart illustrating an embodiment of a method for providing an access control list.
Figure 4:
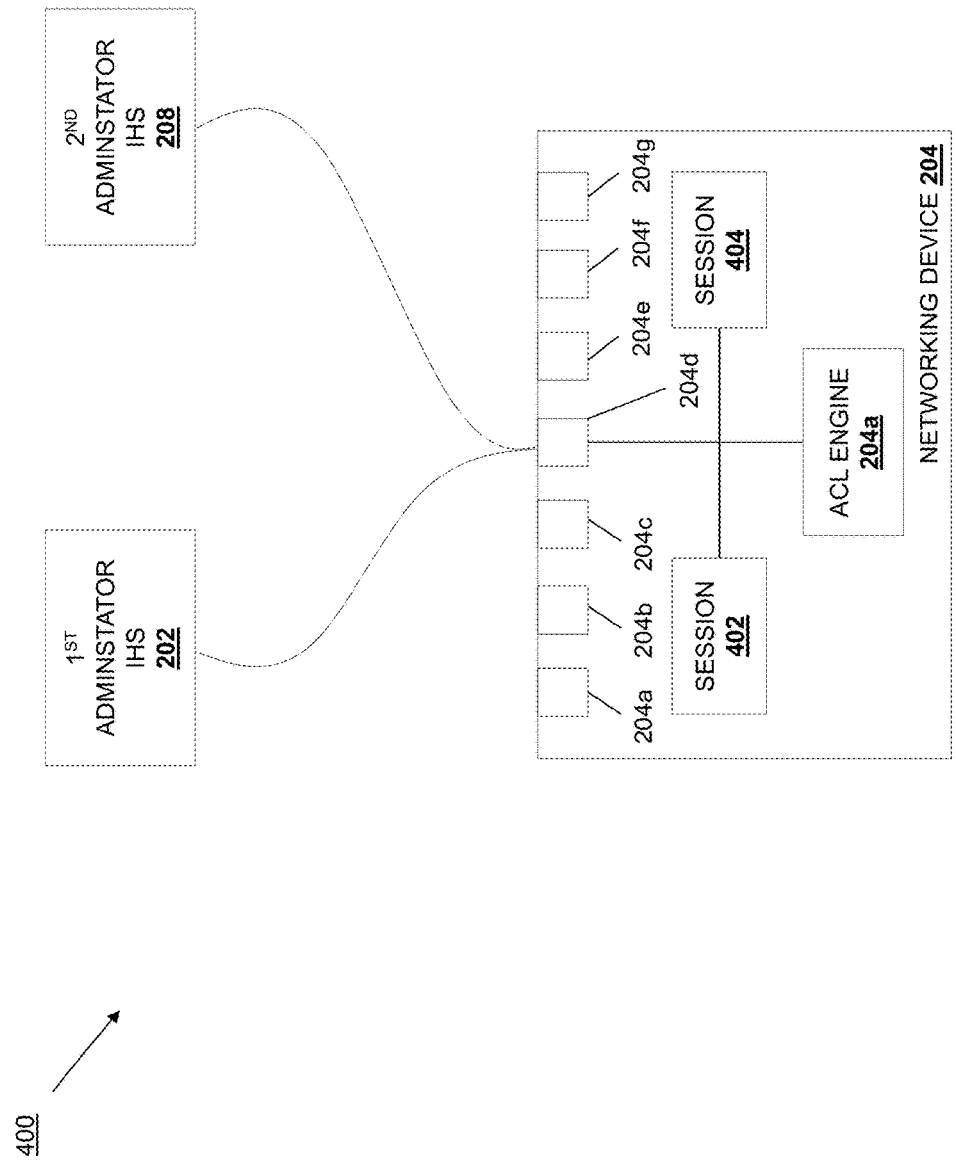
FIG. 4 is a schematic view illustrating an embodiment of an access control list being provided on a networking IHS according to the method of FIG. 3.

Referring now to FIGS. 3 and 4, an embodiment of a method 300 for providing access control lists is illustrated. FIG. 4 illustrates an embodiment 400 of the access control list lockout prevention system 200 prior to or during the performance of the method 300. The networking device 204 includes a plurality of interfaces 204a, 204b, 204c, 204d, 204e, 204f, and 204g which may be, for example, ports, inputs, connectors, and/or a variety of other interfaces known in the art. In the illustrated embodiment 400 of the access control list lockout prevention system 200, each of the first administrator IHS 202 and the second administrator IHS 208 are communicatively coupled to the interface 204d (e.g., through the network 206 and/or other networking devices) and providing configuration data traffic that terminates at the networking device 204. The networking device 204 includes a memory system (not illustrated, but which may be the system memory 114 discussed above with reference to FIG. 1) that includes instructions that, when executed by a processing system in the networking device 204 (not illustrated, but which may be the processor 102 discussed above with reference to FIG. 1), cause the processing system provide an access control list engine 204a that is configured to provide a session 402 to the first administrator IHS 202, a session 208 to the second administrator IHS 208, to perform any of the functions of the access control list engines discussed below, and/or perform any other networking functions known in the art. While the access control list engine 204a is illustrated and described below as being located in the networking device 204, the access control list engine could be instead located in the first administrator IHS 202, and one of skill in the art in possession of the present disclosure will recognize how such a first administrator IHS 202 access control list engine could be configured to communicate with the networking device 204 to perform the functions discussed below for the access control list engine 204a while remaining within the scope of the present disclosure.

In one example, either or both of the first administrator IHS 202 and the second administrator 208 may log into the networking device 204 (e.g., via a virtual teletype (VTY) connection using the Telnet interface and protocol, the Secure Shell (SSH) interface and protocol, and/or a variety of other interfaces and protocols known in the art) via their communicative connections to the networking device 204 to establish the respective sessions 402 and/or 404 such that they may, for example, configure and/or modify the settings of the networking device. In the example discussed below, the first administrator IHS 202 has logged into the networking device 204 and established the session 402 to configure a layer 3 access control list.

Figure 5:
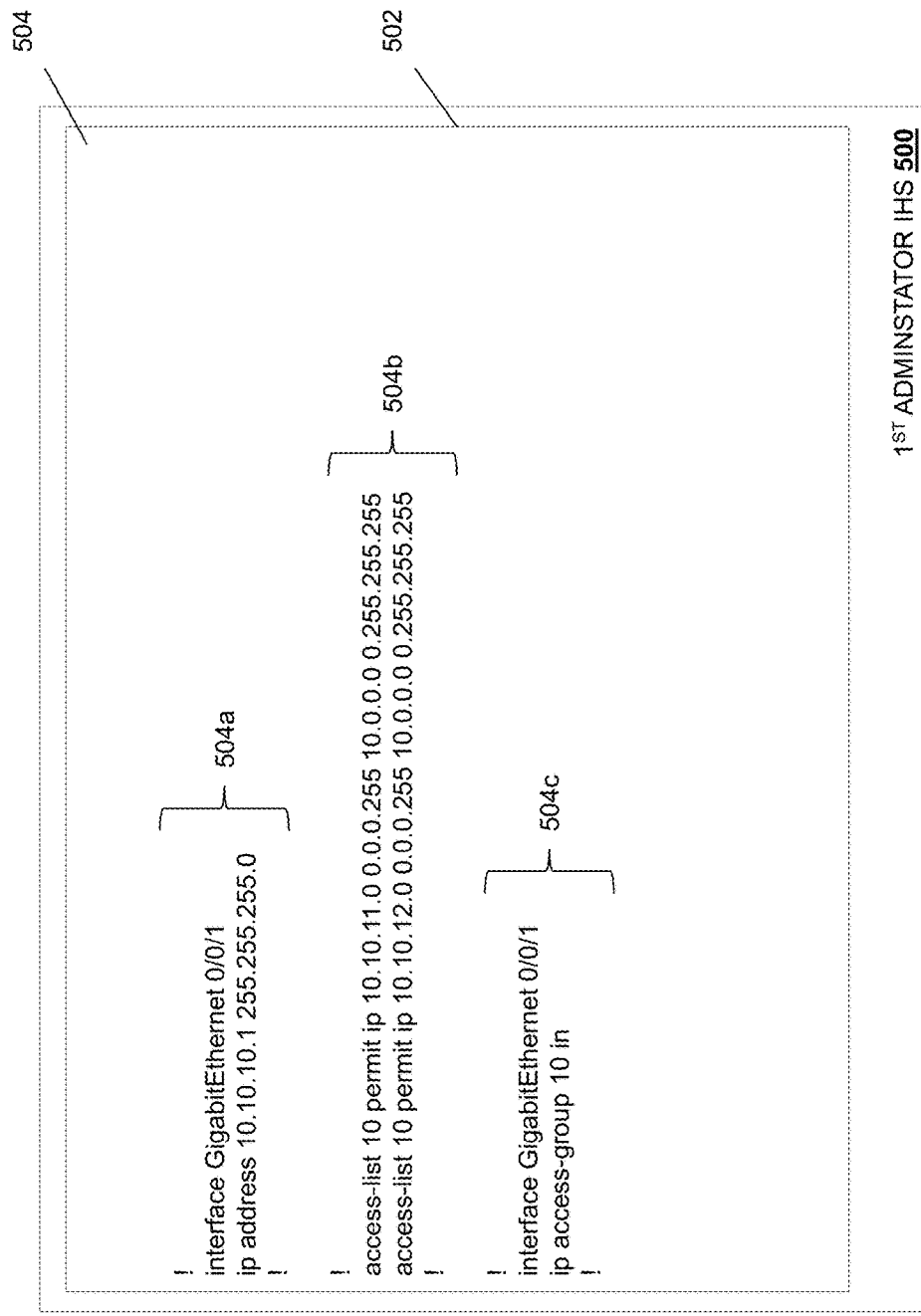
FIG. 5 is a screen shot view illustrating an embodiment of an administrator IHS being used to provide an access control list.

Referring now to FIGS. 2, 3, 4, and 5, the method 300 begins at block 302 where an access control list instruction is received for an interface on the networking device. In an embodiment, an access control list instruction or access control list may be received by the access control list engine 204a in the networking device 204 through the network 206 from an administrator user via the first administrator IHS 202. FIG. 5 illustrates a first administrator IHS 500 which may be for example, the first administrator IHS 202 discussed above and that includes a display device 502 displaying an access control list input screen 504. The access control list input screen 504 illustrates an embodiment of access control list instructions that may be provided by an administrator user that is configuring an access control list on the networking device 504, and may define, specify, or otherwise include the protocols, Internet Protocol (IP) addresses, actions (e.g., permit, deny, log, etc.), and/or a variety of other characteristics known in the art for access control entries in access control lists. In the examples provided below, the first administrator IHS 202/500 includes an IP address of 10.10.20.33 and the networking device 204 includes an IP address of 10.10.10.1 for the sake of discussing one specific example of the performance of the method 300.

The access control list input screen 504 includes a networking device address configuration section 504a that operates to configure the IP address of the networking device 204 on the interface 204d (e.g., also referred to herein as interface "GigabitEthernet 0/0/1"). The access control list input screen 504 also includes an access control list 504b. As would be understood by one of skill in the art, the statements in the access control list 504b of the illustrated embodiment are inverse masking statements in which, for each respective bit in the IP address provided, zero's require a match and one's do not. As such, the first (i.e., top) permit statement in the access control list 504b of the illustrated embodiment ("access-list 10 permit ip 10.10.11.0 0.0.0.255 10.0.0.0 0.255.255.255"), once executed or applied, would operate to permit IP addresses beginning with 10.10.11.x. Similarly, the second (i.e., bottom) permit statement in the access control list 504b of the illustrated embodiment ("access-list 10 permit ip 10.10.12.0 0.0.0.255 10.0.0.0 0.255.255.255"), once executed or applied, would operate to permit IP addresses beginning with 10.10.12.x. Furthermore, while not explicitly illustrated on access control list input screen 504, one of skill in the art would also recognize that the access control list 504b of the illustrated embodiment includes an implicit deny statement following the second (i.e., bottom) permit statement in the access control list 504b that, once executed or applied, would operate to deny any IP addresses not permitted by the permit statements.

The access control list input screen 504 also includes an access control list application instruction 504c that operates to apply the access control list 504b to inbound traffic (e.g., "ip access group 10 in") on the interface 204d (e.g., interface "GigabitEthernet 0/0/1"). As is known in the art, an access control list may be applied to one or more interfaces on a networking device along with a specification of direction (i.e., to inbound data traffic or outbound data traffic), and thus the application of the access control list 504b to inbound traffic on a single interface 204d in FIG. 5 is provided merely as an example, and the application of access control lists to more than one interface and in a different direction are envisioned as falling within the scope of the present disclosure. Furthermore, while an example of an access control list including inverse masking permit statements (and an implicit deny statement) that is applied to a single interface on a networking device is provided, a wide variety of access control lists using, for example, normal masking statements, explicit deny statements, log statements, and/or a variety of other access control list features known in the art are envisioned as falling within the scope of the present disclosure.

At block 302, the administrator user of the first administrator IHS 202 uses an input device (e.g., selecting an "enter" key on a keyboard following the provision of the access control list application instruction 504c) to provide an instruction to execute the access control list application instruction 504c such that the access control list 504b is applied to the interface 204d of the networking device 204 specified in the networking device address configuration section 504a. In conventional access control list systems, such an instruction to execute the access control list application instruction 504c would cause the administrator IHS 202 and networking device 204 to operate in the session 402 to execute the access control list application instruction 504c and apply the access control list 504b on the interface 204d of the networking device 204 in the networking device address configuration section 504a. Using the example introduced above where the first administrator IHS 202 has an IP address of 10.10.20.33, the access control list 504b permits IP addresses beginning with 10.10.11.x and 10.10.12.x and denies all other IP addresses, and the execution of the access control list application instruction 504c and application of the access control list 504b on the interface 204d of the networking device 204 in the networking device address configuration section 504a in such conventional systems would cause the first administrator IHS 202 to become "locked out" or to lose access to the networking device 204. The access control list lockout prevention system 200 and method 300 of the present disclosure operates to prevent such lockouts or losses of access by analyzing access control lists, the networking devices to which they are being applied, and the IHSs that are communicatively connected to those networking devices, and then warning a user if the access control list they are trying to apply will cause a lockout or loss of access prior to the execution of its access control list instruction or application of that access control list on a networking device. For example, prior to the operating system of the networking device 204 activating the access control list 504b on the interface 204d, the access control list engine 204a in the networking device 204 may perform the functions of the method 300 discussed below to determine whether administrator IHSs and/or other user IHSs that are communicatively connected to the networking device 204 will lose access to the networking device 204 and, if so, warn the administrator user providing the access control list of such.

Following the receiving of the access control list instruction at block 302, the method 300 proceeds to decision block 304 where it is determined whether destination addresses in the access control list include an IP address of the networking device. In an embodiment, the access control list engine 204a in the networking device 204 retrieves the IP addresses associated with the interfaces 204a-g on the networking device 204 and compares those IP addresses to the destination addresses that are included in the access control list 504b. For example, both the first (i.e., top) permit statement and the second (i.e., bottom) permit statement in the access control list 504b of the illustrated embodiment include the same destination address ("10.0.0.0 0.255.255.255"). One of skill in the art will recognize that these destination addresses will match many networking device IP address that begins with 10.x.x.x. As discussed above, in our example the networking device 204 includes an IP address of 10.10.10.1 and, as such, at decision block 304 the access control list engine 204a would determine that the destination address(es) in the access control list 504b include the IP address of the networking device 204. If, at decision block 304, it is determined that the destination addresses in the access control list do not include an IP address of the networking device, the method 300 proceeds to block 306 where the access control list is added to the networking device. In an embodiment of block 306, the first administrator IHS 202 and the networking device 204 may operate according to the session 402 to execute the access control list application instruction 504c and apply the access control list 504b on the interface 204d of the networking device 204 in the networking device address configuration section 504a to add the access control list 504b to the device configuration of the networking device 204 and make the access control list 504b active using methods known in the art.

Figure 6:
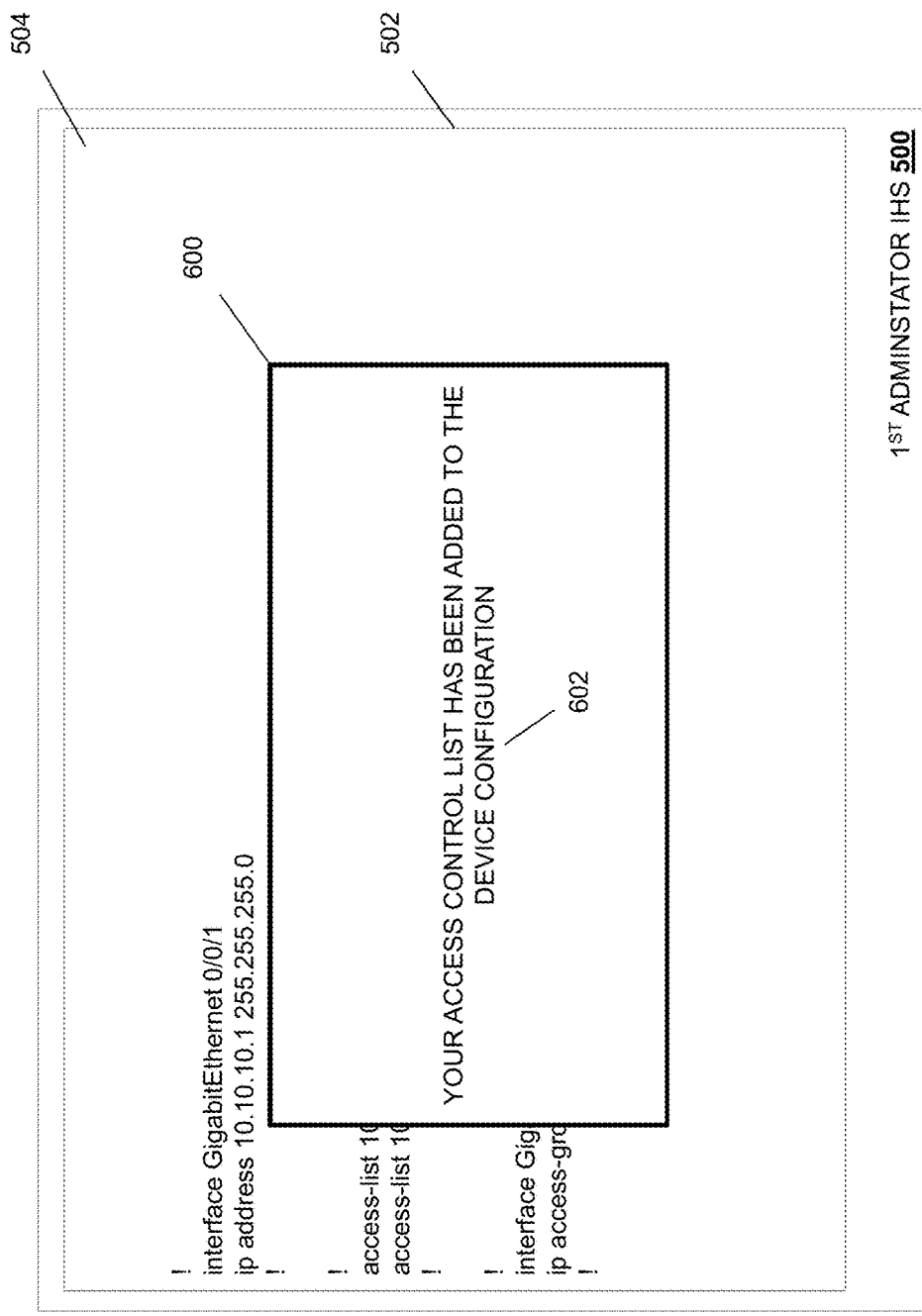
FIG. 6 is a screen shot view illustrating an embodiment of an administrator IHS displaying an access control list acceptance screen.

Referring now to FIG. 6, the first administrator IHS 500 that was used to provide the access control list input screen 504 in FIG. 5 is illustrated displaying an access control list acceptance screen 600 that may be provided at block 306 of the method 300. The illustrated embodiment of the access control list acceptance screen 600 provides an access control list acceptance message 602 that indicates to the administrator user of the first administrator IHS 500 that the access control list has been added to the configuration of the networking device 204. The access control list acceptance screen 600 may be provided by the access control list engine 204a over the network 206 and, as illustrated, may be displayed by the first administrator IHS 500 on the display device 502 overlaying the access control list input screen 504 (e.g., following the provision by the administrator user of the access control list instruction 504c and the addition of the access control list 504b to the device configuration of the networking device 204). However, any other methods for indicating to an administrator user that an access control list has been added to the configuration of a networking device are envisioned as falling within the scope of the present disclosure.

If, at decision block 304, it is determined that the destination addresses in the access control list includes an IP address of the networking device, the method 300 may then proceed to decision block 308 where it is determined whether address(es) of IHS(s) are entering the networking device via an interface to which the access control list is to be applied. In some embodiments, the access control list lockout prevention system 200 may only be concerned with preventing lockouts of administrator IHSs, and at decision block 308 it may only be determined whether address(es) of the administrator IHS(s) 202 and/or 208 are entering the networking device 204. However, in other embodiments, the access control list lockout prevention system 200 may be concerned with preventing lockouts of any IHSs, and at decision block 308 it may be determined whether (es) address of any IHS(s) (e.g., the administrator IHSs 202, 208 and/or the user IHSs 210) are entering the networking device 204.

In an embodiment of decision block 308, the access control list engine 204a may access a routing table in the networking device 204 and determine whether source/IP address(es) of IHS(s) are included in that routing table in association with the interface to which the access control list will be applied. For example, the access control list engine 204a may use a "longest match rule" to determine whether the IP address of the first administrator IHS 202 (i.e., 10.10.20.33 in out example) is being learned off of the interface 204d to which the access control list 504b will be applied. Using the example of the access control list 504b in FIGS. 5 and the embodiment 400 of the access control list lockout prevention system 200 discussed above, the first administrator IHS 202 and the second administrator IHS 208 are communicatively connected to the interface 204d, and thus at decision block 308 it would be determined that the IP addresses of the first administrator IHS 202 and the second administrator IHS 208 are entering the interface 204d (i.e., interface "GigabitEthernet 0/0/1") to which the access control list 504b will be applied. If at decision block 308 it is determined that no IHS address(es) (or no administrator IHS address(es)) are entering the networking device via the interface to which the access control list will be applied, the method 300 proceeds to block 306 where the access control list is added to the networking device (and in some embodiments, the access control list acceptance screen 600 of FIG. 6 is provided) as discussed above.

If, at decision block 308, it is determined that IHS address(es) (or administrator IHS address(es)) are entering the networking device via the interface to which the access control list will be applied, the method 300 then proceeds to decision block 310 where it is determined whether those address(es) of the IHS(s) are subject to an access control list permit statement prior to being subject to an access control list deny statement in the access control list. In some embodiments, the access control list lockout prevention system 200 may only be concerned with preventing lockouts of administrator IHSs, and at decision block 308 it may only be determined whether the address(es) of the administrator IHS(s) determined at decision block 308 are subject to a permit statement prior to being subject to a deny statement in the access control list. However, in other embodiments, the access control list lockout prevention system 200 may be concerned with preventing lockouts of any IHSs, and at decision block 308 it may be determined whether the address(es) of any IHS(s) determined at decision block 308 (e.g., the administrator IHSs 202, 208 and/or the user IHSs 210) are subject to a permit statement prior to being subject to a deny statement in the access control list.

In an embodiment of decision block 310, the access control list engine 204a may perform a bit-wise comparison of the source/IP address(es) of each IHS determined at decision block 308 with the statements in the access control list 504b in the order that they appear in order to determine whether those IP addresses are subject to permit statements prior to being subject to a deny statement in the access control list 504b. For example, the access control list engine 204a may compare the IP address of the first administrator IHS 202 (i.e., 10.10.20.33 in our example) to the permit statements (i.e., "access-list 10 permit ip 10.10.11.0 0.0.0.255 10.0.0.0 0.255.255.255" and "access-list 10 permit ip 10.10.12.0 0.0.0.255 10.0.0.0 0.255.255.255" in our example) in the access control list 504*b* to determine whether the administrator IHS 202 is subject to those permit statements prior to being subject to the implicit deny statement in the access control list 504*b*, discussed above. One of skill in the art will recognize that, in such an example, the IP address of the first administrator IHS 202 (10.10.20.33) is not subject to either of permit statements in the access control list 504*b* (i.e., because they only permit IP addresses starting with 10.10.11.x and 10.10.12.x). However, assuming the second administrator IHS 208 has an IP address of 10.10.11.40 or 10.10.12.22, the access control list engine 204*a* would determine that the IP address for the second administrator IHS 208 is subject to a permit statement prior to being subject to a deny statement in the access control list 504*b*. If at decision block 310 it is determined that each of the IHS address(es) (or administrator IHS address(es)) determined at decision block 308 are subject to a permit statement prior to being subject to a deny statement in the access control list, the method 300 proceeds to block 306 where the access control list is added to the networking device (and in some embodiments, the access control list acceptance screen 600 of FIG. 6 is provided) as discussed above.

If, at decision block 310, it is determined that one or more of the IHS address(es) (or administrator IHS address(es)) are not subject to a permit statement prior to being subject to a deny statement in the access control list, the method 300 proceeds to decision block 314 where it is determined whether those one or more address(es) of the IHS(s) are subject to a deny statement in the access control list. In some embodiments, the access control list lockout prevention system 200 may only be concerned with preventing lockouts of administrator IHSs, and at decision block 314 it may only be determined whether the one or more address(es) of the administrator IHS(s) determined at decision block 310 are subject to a deny statement in the access control list. However, in other embodiments, the access control list lockout prevention system 200 may be concerned with preventing lockouts of any IHSs, and at decision block 314 it may be determined whether the one or more address(es) of any IHS(s) determined at decision block 310 (e.g., the administrator IHSs 202, 208 and/or the user IHSs 210) are subject to a deny statement in the access control list.

In an embodiment of decision block 314, the access control list engine 204*a* continues to perform the bit-wise comparison of the one or more source IP address(es) of the IHS(s) determined at decision block 310 with the statements in the access control list 504*b* in the order that they appear following the permit statement analysis of decision block 310 in order to determine whether those IP addresses are subject to deny statements in the access control list 504*b*. As discussed above, the access control list 504*b* of FIG. 5 includes an implicit deny statement that denies all IP addresses that are not permitted by its permit statements (i.e., "access-list 10 permit ip 10.10.11.0 0.0.0.255 10.0.0.0 0.255.255.255" and "access-list 10 permit ip 10.10.12.0 0.0.0.255 10.0.0.0 0.255.255.255" in our example), and at block 314, upon reaching that implicit deny statement, the access control list engine 204*a* will determine that the IP address of the administrator IHS 202 is subject to the implicit deny statement. However, in other embodiments, the access control list may include explicit deny statements (e.g., "access-list 10 deny ip 10.10.20.0 0.0.0.255 10.0.0.0 0.255.255.255") that include the IP address of the administrator IHS 202. If at decision block 314 it is determined that the one or more IHS address(es) (or administrator IHS address(es)) determined at decision block 310 are not subject to a deny statement in the access control list, the method 300 proceeds back to block decision block 310 where it is determined whether the address(es) of the IHS(s) are subject to an access control list permit statement prior to being subject to an access control list deny statement in the access control list. In this manner, the access control list engine 204*a* moves through the permit statements and the deny statements in the access control list to determine how they apply to the addresses of the IHSs entering the interface of the networking device to which the access control list is to be applied.

If at decision block 314 it is determined that at least one of the one or more IHS source address(es) (or administrator IHS source address(es)) determined at decision block 310 are subject to a deny statement in the access control list, the method 300 proceeds to block 312 where a warning is provided on the administrator IHS that provided the access control list. In an embodiment, the access control engine 204*a* in the networking device 204 provides a warning message over the network 206 for display on the first administrator IHS 202.

Figure 7:
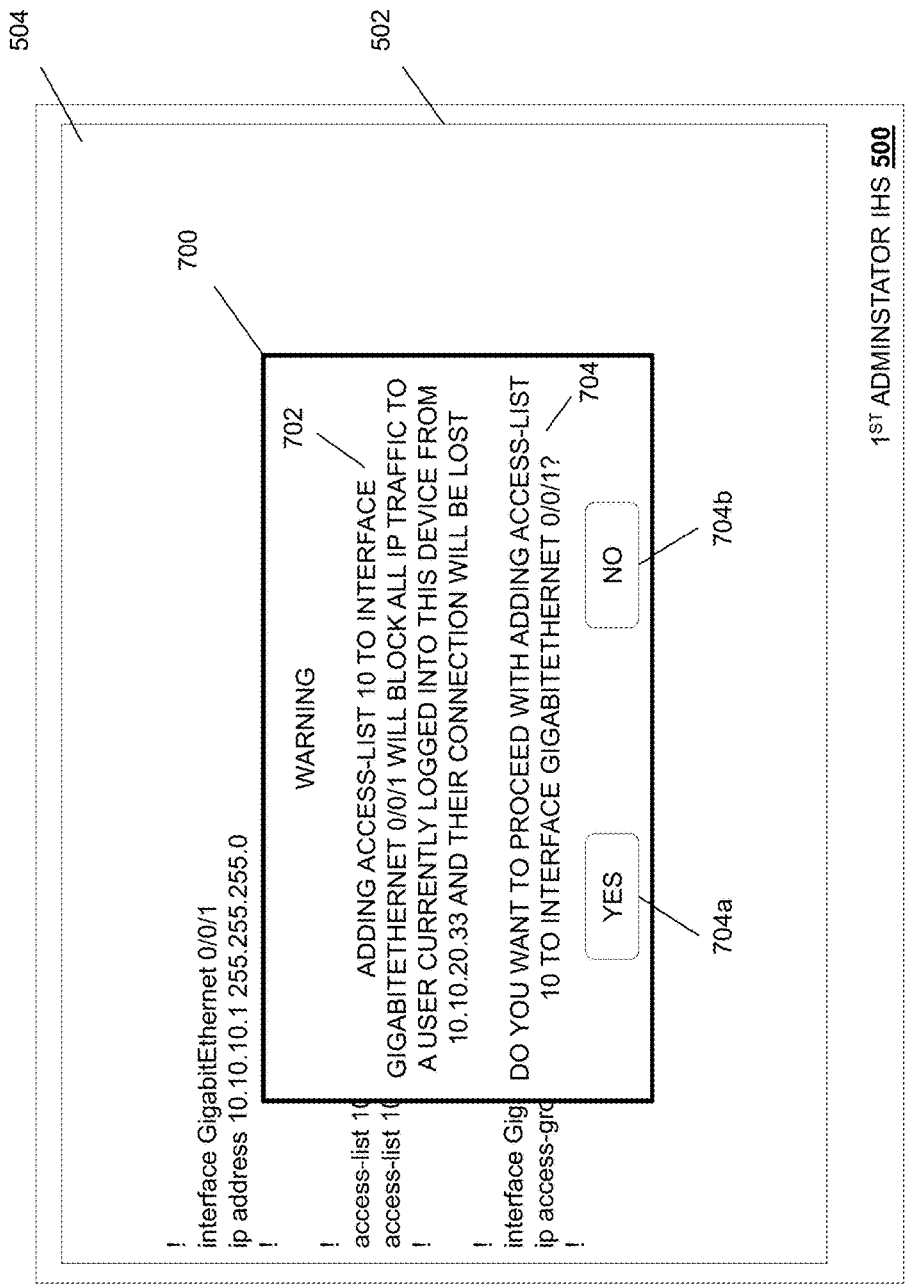
FIG. 7 is a screen shot view illustrating an embodiment of an administrator IHS displaying an access control list warning screen.

Referring now to FIG. 7, the first administrator IHS 500 that was used to provide the access control list input screen 504 in FIG. 5 is illustrated displaying an access control list warning screen 700 that may be provided at block 312 of the method 300. The illustrated embodiment of the access control list warning screen 700 provides an access control list warning message 702 that indicates to the administrator user of the first administrator IHS 500 that adding the access control list that was provided to the interface specified in the access control list will block access to a user that is currently logged into the networking device. In the illustrated example, the access control list warning message 702 indicates to the administrator user of the first administrator IHS 500 that adding the access control list 504*b* (i.e., "access-list 10") to the interface 204*d* (i.e., interface "GigabitEthernet 0/0/1") will block all IP traffic from the administrator user of the first administrator IHS 202/500 that is logged into the networking device 204 (from the IP address 10.10.20.33) and their connection will be lost. While an example of an access control list warning screen 700 that warns the administrator user of the first administrator IHS 500 that they are about to lock themselves out of the networking device 204 that they are configuring with the access control list 504*b* is provided, one of skill in the art in possession of the present disclosure will recognize that the access control list warning screen 700 may warn the administrator user of the first administrator IHS 500 that they are about to lock any IHS (or administrator IHS) out of the networking device 204 that they are configuring with the access control list 504*b*. The access control list warning screen 700 also includes a confirmation message 704 that asks the administrator user of the first administrator IHS 500 whether they would like to proceed with adding the access control list to the interface 204*d* on the networking device 204 (i.e., whether they want to proceed with adding "access-list 10" to the "GigabitEthernet 0/0/1"), along with a yes selector 704*a* and a no selector 704*b*.

The access control list warning screen 700 may be provided by the access control list engine 204*a* and, as illustrated, may be displayed by the first administrator IHS 500 on the display device 502 overlaying the access control list input screen 504 (e.g., following the provision by the administrator user of the access control list instruction 504*c* and the determination by the access control list engine 204a that the access control list 504b will cause an IHS that is communicatively connected to the networking device 204 to lose access to the networking device 204). However, any other methods for indicating to an administrator user that an IHS that is communicatively connected to a networking device will lose access to that networking device are envisioned as falling within the scope of the present disclosure. In response to the administrator user of the first administrator IHS 500 selecting the yes selector 704a in the confirmation message 704 (e.g., because the administrator user of the first administrator IHS 500 would like to block access to the user IHS and/or administrator IHS that is communicatively connected to the networking device and that is subject to a denial of access to the networking device via the access control list), the access control list may be added to the networking device as discussed above with reference to block 306 and, in some embodiments, the access control list acceptance screen 600 of FIG. 6 may be provided.

Figure 8:
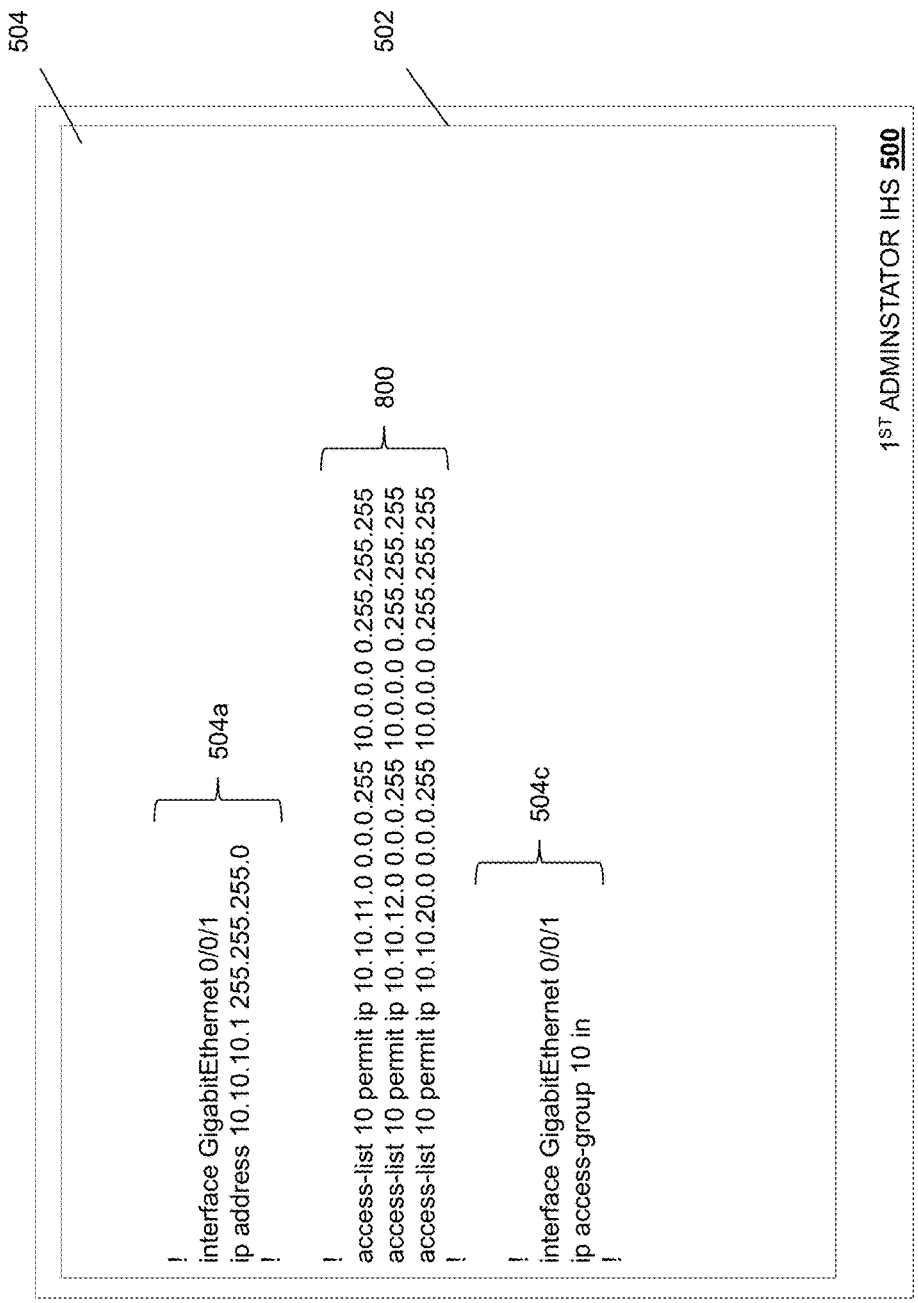
FIG. 8 is a screen shot view illustrating an embodiment of an administrator IHS being used to correct an access control list.

Referring now to FIG. 8, in response to the administrator user of the first administrator IHS 500 selecting the no selector 704b in the confirmation message 704, the access control list input screen 504 may again be provided on the display device 502 of the first administrator IHS 500 in order to allow the administrator user to correct the access control list 504b that was determined would cause an IHS that is communicatively connected to networking device 204 to lose access to that networking device 204. FIG. 8 illustrates the access control list input screen 504 that includes an access control list 800 that was modified by the administrator user (e.g., from the access control list 504b illustrated in FIG. 5) to add a permit statement (i.e., "access-list 10 permit ip 10.10.20.0 0.0.0.255 10.0.0.0 0.255.255.255") that, in our example, will allow the first administrator IHS 202/500 to continue to access the networking device 204 upon addition of the access control list 800 to the configuration of the networking device 204 (i.e., because that permit statement allows any IP addresses that start with 10.10.20.x, and the IP address of the first administrator IHS 500 is 10.10.20.33). One of skill in the art will recognize that the administrator user may modify an access control list in a variety of manners known in the art (e.g., by adding other permit statements, modifying or removing deny statements, etc.) to ensure access for any IHS that they would like to have continued access to a networking device while remaining within the scope of the present disclosure.

Thus, systems and methods have been described that provide for the analysis of an access control list, the networking device to which is will be applied, and the IHSs that are connected to that networking device, prior to the application of that access control list in order to determine whether that access control list will cause any of the IHSs that are connected to that networking device to lose access to that networking device. When an administrator user attempts to configure a networking device with an access control list that will cause their user IHS (or other user IHSs connected to that networking device) to lose access to that networking device (i.e., the application of the access control list will deny traffic to or from the IP address of that user IHS), the systems and methods of the present disclosure will warn that administrator user so that the administrator user can modify the access control list to ensure that their user IHS will have continued access to that networking device upon being configured with the modified access control list. Such systems and methods save time, reduce losses in productivity, and prevent embarrassment for administrator users that otherwise might incorrectly configure a networking device with an access control list and subsequently lock themselves out of that networking device such that they require help to regain access.

As discussed in further detail below, other embodiments of the present disclosure provide systems and methods for preventing the lockout of a management IHS from a managed IHS that the management IHS is managing. For example, a management IHS may communicate with a managed IHS through a standard network interface or in-band management connection (e.g., as opposed to a dedicated management network interface or out-of-band management connection) without the knowledge of the user operating the management IHS of that standard network interface/in-band management connection. In such situations, the user may unknowingly cause the management IHS to provide management data traffic to the managed IHS that includes a configuration instruction that may inhibit the communication between the management IHS and the managed IHS. For example, the configuration instruction may change the management Internet Protocol (IP) address of the managed IHS such that the management IHS will no longer be able to communicate with the managed IHS. In another example, the configuration instruction may shut down the standard network interface/in-band management connection so that a switch configuration may be validated and/or verified, which will prevent the management IHS from sending any further management data traffic to the managed IHS through that standard network interface/in-band management connection. In another example, the configuration instruction may aggregate the standard network interface/in-band management connection with other network interfaces on the managed IHS, which may prevent the management IHS from properly communicating with the managed IHS through that standard network interface/in-band management connection. In yet another example, a user may inadvertently include their in-band management port in an "interface range" command that applies any of a variety of configuration instructions to a plurality of ports that, when applied to the in-band management port, will prevent the management IHS from communicating with the managed IHS. While several examples of configuration instructions that may inhibit communications between the management IHS and the managed IHS are provided, one of skill in the art in possession of the present disclosure will recognize that the systems and methods described herein may operate to prevent lockout of a management IHS in response to any of a wide variety of configuration instructions known in the art that would inhibit communications between the management IHS and the managed IHS.

Figure 9:
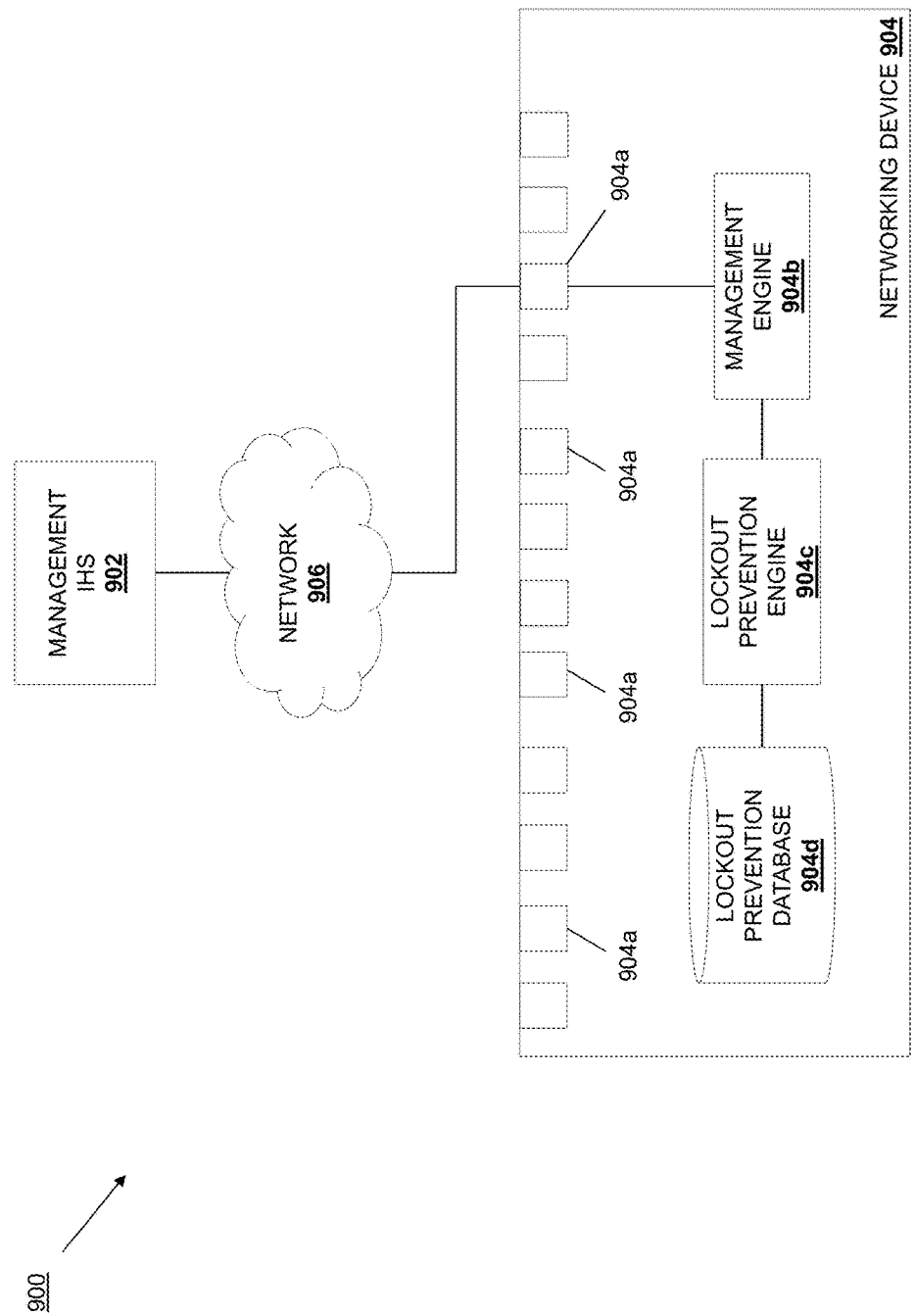
FIG. 9 is a schematic view illustrating an embodiment of a lockout prevention system.

Referring now to FIG. 9, an embodiment of a lockout prevention system 900 is illustrated. The lockout prevention system 900 includes a management IHS 902, which may be the IHS 100 discussed above with reference to FIG. 1 and/or include some or all of the components of the IHS 100, that is communicatively coupled through a network 906 (e.g., a Local Area Network (LAN), the Internet, and/or a variety of other networks known in the art) to a managed IHS that, in the illustrated embodiment, is a networking device 904. In an embodiment, the networking device 904 may be the IHS 100 discussed above with reference to FIG. 1 and/or include some or all of the components of the IHS 100, and in specific embodiments may include a switch IHS, a router IHS, and/or a variety of other layer 3 networking IHSs known in the art. The networking device 904 includes a plurality of a network interfaces that, in the embodiments discussed below, are communication ports 904a. However, the discussion of communication ports below may include any subsystems associated with those communication ports, as well as other network interfaces known in the art. In some embodiments, one or more user IHSs (not illustrated), each of which may be the IHS 100 discussed above with reference to FIG. 1 and/or include some or all of the components of the IHS 100, are communicatively coupled to the networking device 904 through the network 906 and/or through one or more of its communication ports 904a.

The networking device 904 includes at least one processing system (e.g., the processor 102 discussed above with reference to FIG. 1) and at least one non-transitory memory system (e.g., the system memory 114) including instructions that, when executed by the processing system, cause the at least one processing system to provide a management engine 904b that is coupled to each of the communication ports 904a (e.g., via a coupling between each of the communication ports 904a and the at least one processing system used in providing the management engine 904b) and that is configured to perform any of the functions of the management engines and networking devices discussed below. The networking device 904 also includes at least one processing system (e.g., the processor 102 discussed above with reference to FIG. 1) and at least one non-transitory memory system (e.g., the system memory 114) including instructions that, when executed by the at least one processing system, cause the at least one processing system to provide a lockout prevention engine 904c that is coupled to the management engine 904b and that is configured to perform any of the functions of the lockout prevention engines and networking devices discussed below. A lockout prevention database 904d may be provided on a storage system (e.g., the mass storage device 108 discussed above with reference to FIG. 1) and coupled to the lockout prevention engine 904c (e.g., via a coupling between the storage system and the at least one processing system used in providing the lockout prevention engine 904c).

In the embodiment illustrated in FIG. 9 and described below, the management engine 904b is only illustrated as being coupled to the communications port 904a through which the management IHS 902 is coupled to the networking device 904. However, as discussed above, the management engine 904b may be coupled to any or all of the communications ports 904a on the networking device 904. As discussed above, in some embodiments, the networking device 904 may be a managed IHS that does not include a dedicated management communication port/out-of-band management port, and as such, the management IHS 902 is coupled to the managed IHS through a standard communications port/in-band management port and provides any management data traffic through that standard communications port/in-band management port. In conventional systems where management IHSs communicate with managed IHSs through standard communication ports/in-band management port, the user of the management IHS may provide management data traffic/control plane traffic that includes a configuration instruction that, once applied, will inhibit communications from the management IHS to the managed IHS (i.e., that configuration instruction is directed to the standard communication port/in-band management port to which the management IHS 902 is connected, and provides some configuration change to that standard communication port/in-band management port). However, the systems and methods of the present disclosure provide the lockout prevention engine 904c and, in some embodiments, the lockout prevention database 904d, to detect when a configuration instruction in management data traffic/control plane traffic may inhibit such communications and, if so, warns the user of the management IHS 902.

Figure 10:
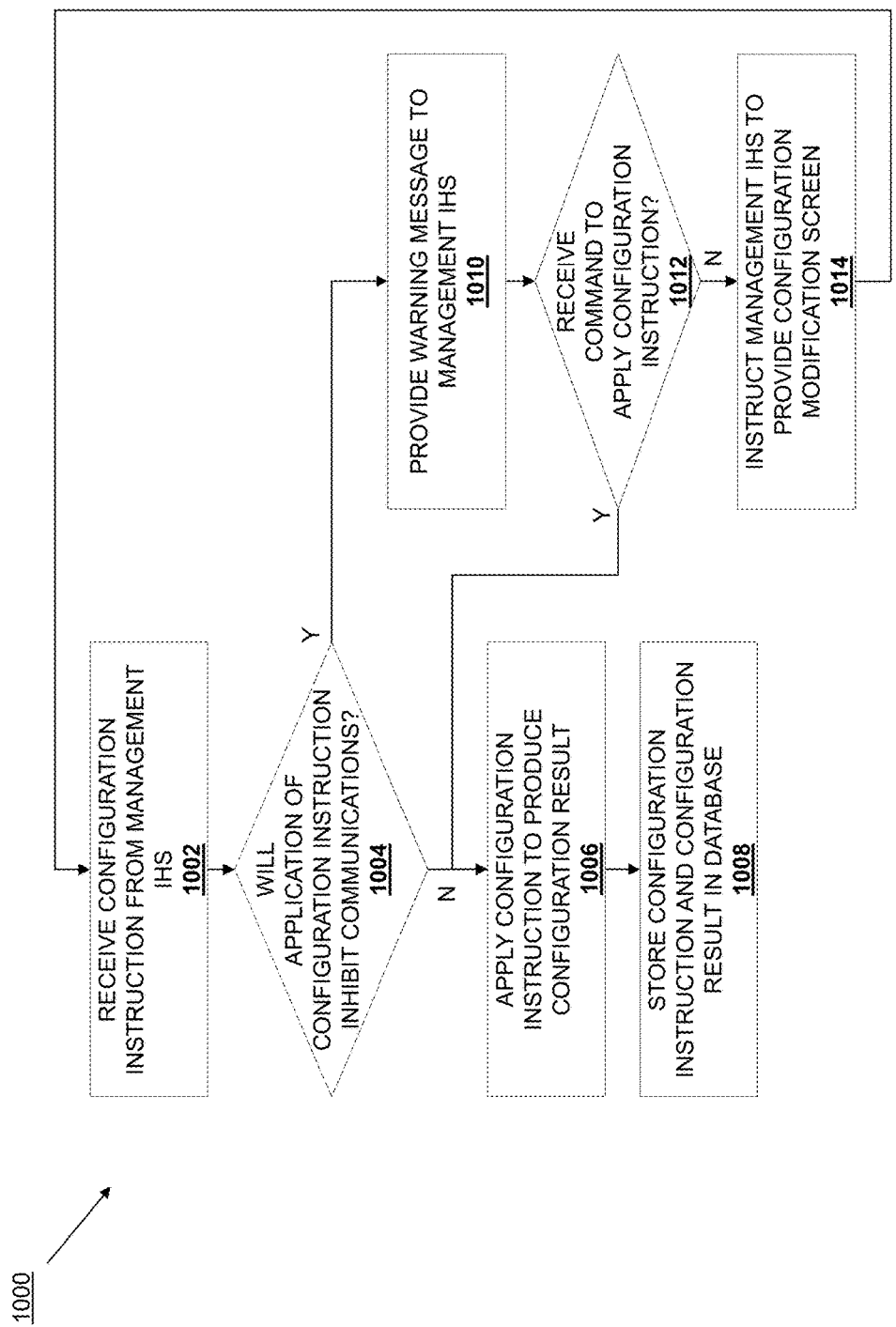
FIG. 10 is a flow chart illustrating an embodiment of a method for preventing the lockout of a management IHS.

Referring now to FIG. 10, an embodiment of a method 1000 for preventing lockouts is illustrated. The embodiment of the method 1000 discussed below is performed using the lockout prevention system 900 of FIG. 9 with the management IHS 902 coupled to the networking device 906 over the network 904 and through the communications port 904a such that the management IHS 902 is not proximate the networking device 904. In such embodiments, the user of the management IHS 902 may be unaware that the management IHS 902 is coupled to the networking device 906 through the communications port 904a that is a standard communications port/in-band management port and that may be affected by particular configuration instructions provided by the user (as opposed to a dedicated management port/out-of-band management port that may not be affected by similar configuration instructions provided by the management IHS 902). As discussed above, the user of the management IHS 902 may be unable to physically reset or otherwise modify the networking device 904 if the communication port 904a is negatively affected by configuration instructions such that communications from the management IHS 902 to the networking device 904 are inhibited, and the application of such configuration instructions may require that the user have someone physically reset the networking device 904, or connect directly to the networking device 904 (e.g., via a connector located on the networking device 904 and not through the network 906), in order to reconfigure that communication port 904a so that the management IHs 902 may once again communicate with the networking device 904. However, a variety of other management IHS/managed IHS configurations and communications situations will benefit from the systems and methods of the present disclosure and thus will fall within the scope of the present disclosure.

Figure 11:
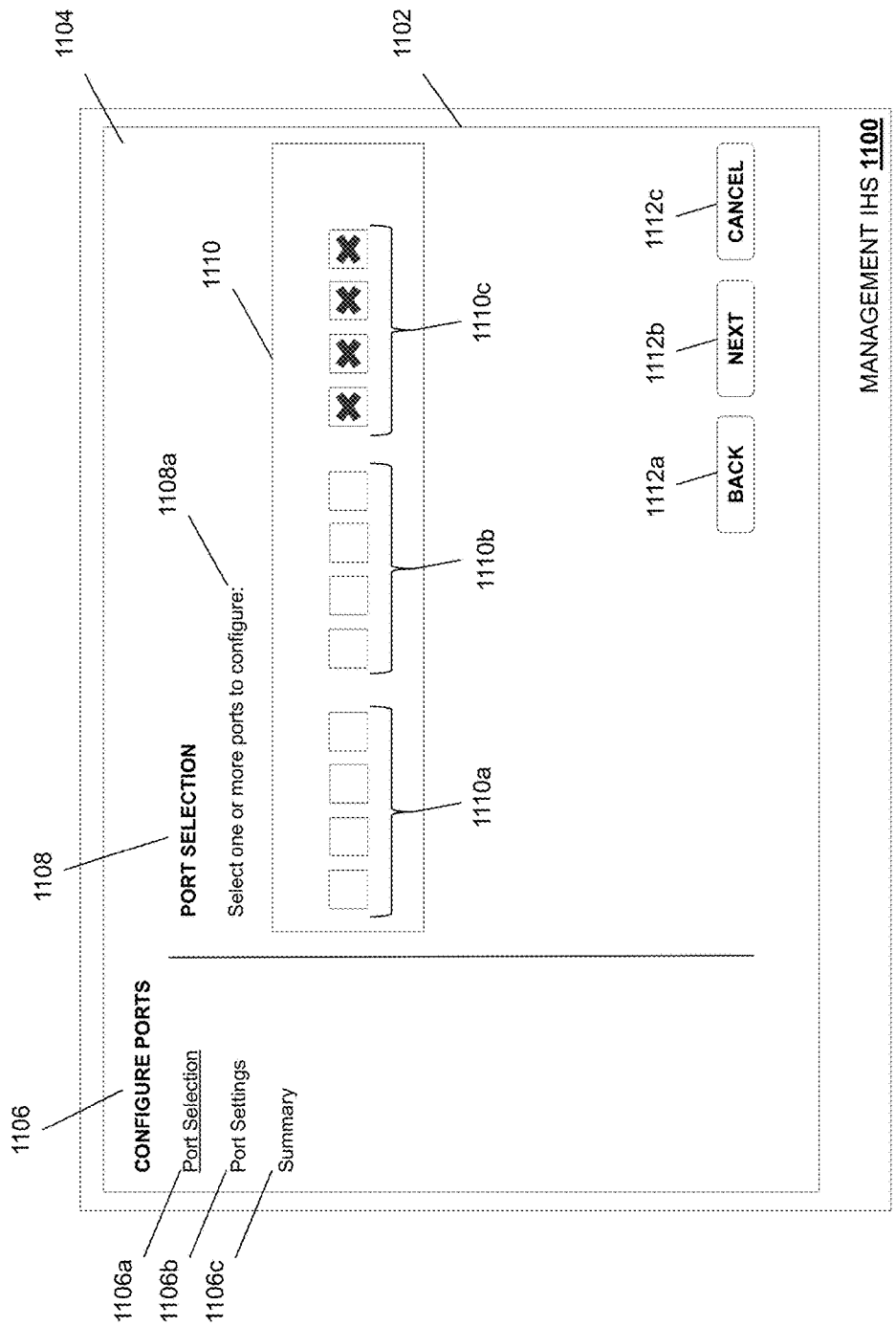
FIG. 11 is a screen shot view illustrating an embodiment of a management IHS being used to select network interfaces for configuration.

The method 1000 begins at block 1002 where a configuration instruction is received from a management IHS. FIG. 11 illustrates a management IHS 1100, which may be the management IHS 902 discussed above, that includes a display device 1102 displaying a first port configuration screen 1104. The first port configuration screen 1104 illustrates an embodiment of one of a plurality of management interface screens discussed below that may be provided on the management IHS 1100 to allow a user to provision management data traffic over the network 906 to the networking device 904. While in the example discussed below, the management interface screen is directed to port configuration, any other types of management interface screens for configuring any portion of a managed IHS will fall within the scope of the present disclosure.

The first port configuration screen 1104 includes a port configuration status bar 1106 that shows a status of port configuration including, in the illustrated embodiment, statuses for port selection 1106a, port settings 1106b, and a summary 1106c. In the illustrated embodiment, the first port configuration screen 1104 is providing for the selection of ports in a port selection section 1108 that includes a port selection instruction 1108a that instructs the user to select ports to configure, a networking device graphic 1110 that includes port graphics 1110a, 1110b, and 1110c that correspond to the communication ports 904a on the networking device 904, and navigation buttons 1112a (e.g., a "back" button), 1112b (a "next" button) and 1112c (a "cancel" button).

Figure 12:
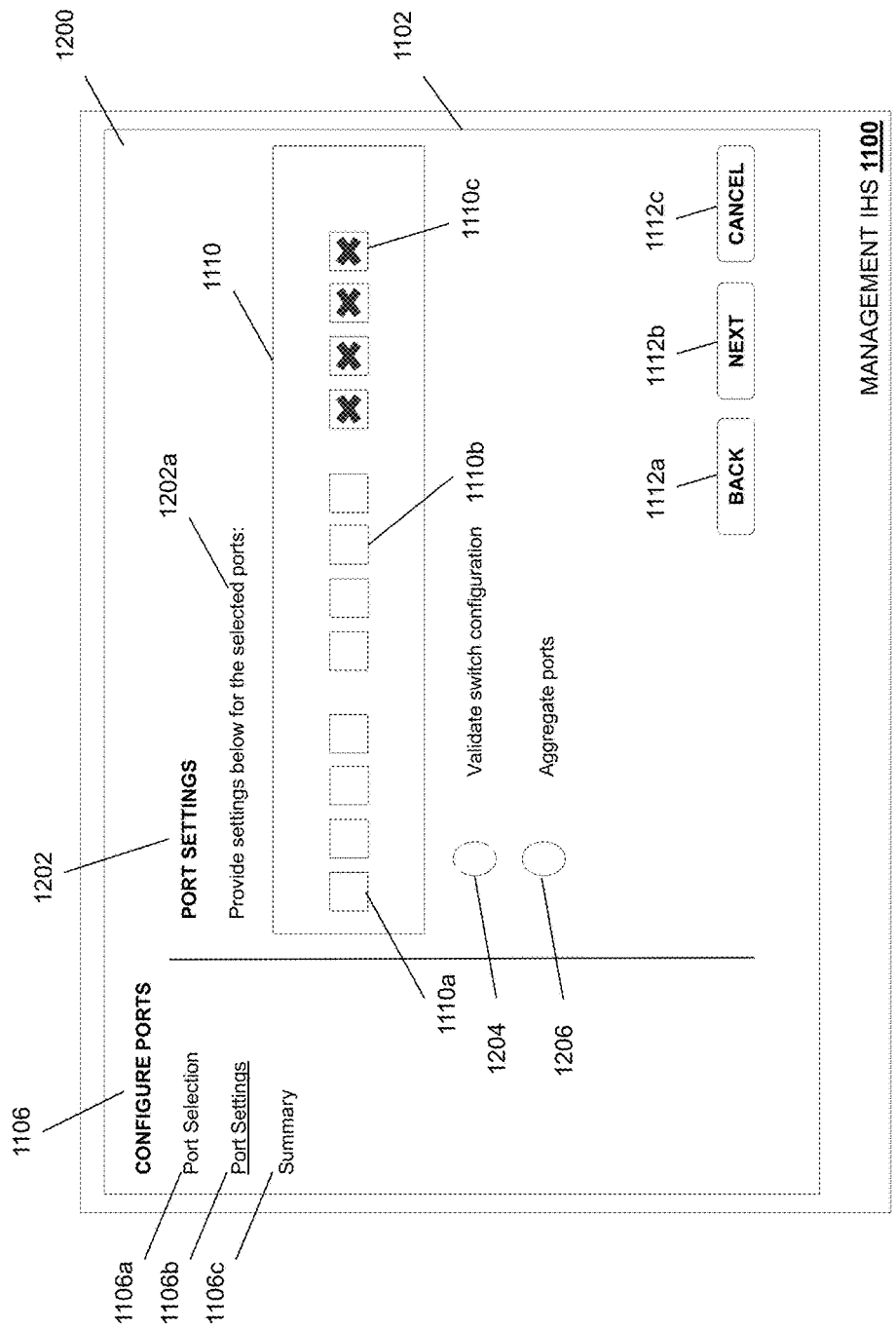
FIG. 12 is a screen shot view illustrating an embodiment of a management IHS being used to provide configuration instructions for network interfaces.

At block 1102, the user of the management IHS 902/1100 may select the port graphics on the networking device graphic 1110 that corresponds to the ports 904*a* on the networking device 904 that the user would like to configure. In the embodiment illustrated in FIG. 11, the user has selected each of the port graphics 1110*c* for configuration, which correspond to four of the communication ports 904*a* on the networking device 904 that include the communication port 904*a* through which the management IHS 902 communicates with the management engine 904*b* in the networking device 904. The user of the management IHS 902/1100 may then select the navigation button 1112*b* (the "next" button) to be provided a second port configuration screen. FIG. 12 illustrates the management IHS 1100 displaying a second port configuration screen 1200 on the display device 1102. The second port configuration screen 1200 includes the port configuration status bar 1106 that shows the status of the port configuration, discussed above. In the illustrated embodiment, the second port configuration screen 1200 is providing for the provision of ports settings in a port settings section 1202 that includes a port settings instruction 1202*a* that instructs the user to provide settings for the ports selected on the first port configuration screen 1104, the networking device graphic 1110 with the port graphics 1110*a*, 1110*b*, and 1110*c* including the selected port graphics 1110*c*, a plurality of port settings selectors including a switch configuration validation selector 1204 and a port aggregation selector 1206, and the navigation buttons 1112*a* (e.g., the "back" button), 1112*b* (the "next" button) and 1112*c* (the "cancel" button).

In an embodiment, the switch configuration validation selector 1204 is selectable by the user to designate one or more configuration instructions for the selected communication ports 904*a* on the network device 904 in order to perform a configuration validation procedure on networking device 904. As discussed below, those one or more configuration instructions may include a configuration instruction to shut down the ports to stop data traffic through those ports in order to allow for the performance of the configuration validation procedure, but may include any of a variety of configuration instructions known in the art for performing a configuration validation procedure on a networking device. In an embodiment, the port aggregation selector 1206 is selectable by the user to designate one or more configuration instructions for the selected communication ports 904*a* on the network device 904 in order to aggregate those selected communication ports 904*a* into, for example, a Link Aggregation Group (LAG). As discussed below, those one or more configuration instructions may include a configuration instruction to aggregate the selected ports into a LAG to provide for the transmission of data through the LAG, but may include any of a variety of configuration instructions known in the art for aggregating a plurality of ports. While a greatly simplified example using port setting selectors has been provided for clarity of illustration and discussion, additional port configuration screens may be provided in response to the user selecting either of the switch configuration validation selector 1204 or the port aggregation selector 1206 in order to allow a configuration validation procedure to be performed on the networking device 904, define the details of the port aggregation to be performed on the selected ports, and/or to define the details of any configuration instructions provided for any type of configuration of the communication ports 904*a* and/or the networking device 904. Furthermore, while specific examples of switch configuration validation and port aggregation configuration instructions are illustrated and described, other management interface screens may be provided on the management IHS 904/1100 to allow the user to designate any of a variety of configuration instructions including, for example, changing the management IP address associated with the networking device 904, providing an IP address for a communication port 904*a*, and/or a variety of other configuration instructions known in the art.

In response to the user selecting the navigation button 1112*b* (the "next" button) on the second port configuration screen 1200 at block 1102, the management IHS 904/1100 sends a plurality of a management data traffic/control plane traffic that includes the one or more configuration instructions over the network 906 to the networking device 904. That management data traffic/control plane traffic is received through the communication port 904*a* on the networking device 904 by the management engine 904*b*. In an embodiment, the management engine 904*b* may distinguish the management data traffic/control plane traffic that is received through the communication port 904*a* and used for controlling the networking device 904 from standard data traffic received through that or other communication ports 904*a* and routed by the networking device 904 using methods known in the art, and once the management data traffic/control plane traffic is identified, the management engine 904*b* may associate it with the management IHS 902, the communication port 904*a* through which it was received, and/or any other parameters known in the art.

The method 1000 then proceeds to decision block 1004 where it is determined whether the application of the configuration instruction received in the management data traffic/control plane traffic will inhibit communications. In an embodiment, upon detecting that it has received the management data traffic/control plane traffic at block 1002, the management engine 904*b* may provide some or all of that management data traffic/control plane traffic to the lockout prevention engine 904*c*. For example, the management engine 904*b* may provide the identity of the management IHS 902, any configuration instructions included in the management data traffic/control plane traffic, the identity of the communication port 904*a* through which the management data traffic/control plane traffic was received, and/or any other configuration parameters or management data traffic information known in the art, to the lockout prevention engine 904*c*. In some examples, the management engine 904*b* may simply forward all management data traffic/control plane traffic to the lockout prevention engine 904*c*. In other examples, the functions of the management engine 904*b* and the lockout prevention engine 904*c* may be integrated such that the management data traffic/control plane traffic does not need to be forwarded prior to decision block 1004, and instead the same management IHS components may detect the management data traffic/control plane traffic and determine the consequences of the application of configuration instructions included in that management data traffic/control plane traffic.

At block 1004, the lockout prevention engine 904*c* analyzes the management data traffic/control plane traffic to determine whether the application of any configuration instructions in the management data traffic/control plane traffic will inhibit communications between the management IHS 902 and the management engine 904*b*/networking device 904. While a few examples of the analysis of configuration instructions are provided below, one of skill in the art will recognize that the application of a wide variety of configuration instructions and/or management data traffic/control plane traffic can operate to inhibit communications from a management IHS and through a communications port to a networking device, and the detection of such by the systems and methods of the present disclosure will fall within the scope of the present disclosure.

In one embodiment, discussed in further detail below, the management data traffic/control plane traffic may include a configuration instruction that provides for a change of the management IP address associated with the networking device 904 such that the network device 904 is no longer reachable (e.g., by changing the management IP address to an IP address that is on a sub-network that does not exist on the network 906). For example, the user of the management IHS 902 may mistype, copy, or otherwise provide an incorrect IP address into a management IP address input on a configuration screen (e.g., similar to the port configuration screens discussed above). One of skill in the art will recognize that the application of such a configuration instruction will change the management IP address that the management IHS 902 uses to access the networking device 904, and because that management IP address does not exist on the network 906, the management IHS 902 will no longer be able to communicate with the networking device 904 (i.e., because it will be communicating using a management IP address that is not associated with the networking device 904). Conventional solutions following the application of such configuration instructions typically require that the user have someone directly connect to the networking device 904 in order to correct the management IP address associated with the networking device 904 such that the management IHS 902 will once again be able to communicate with the networking device 904.

At decision block 1004, the lockout prevention engine 904c may receive the configuration instruction that provides for the changing of the management IP address associated with the networking device 904 and make a determination of whether application of the configuration instruction to change the management IP address associated with the networking device 904 will inhibit communications between the management IHS 902 and the networking device 904. If the lockout prevention engine 904c determines that the new management IP address is still associated with the networking device 904 such that applying that new management IP address will still allow communications between the management IHS 902 and the networking device 904, the method 1000 may proceed to block 1006, discussed in further detail below. If the lockout prevention engine 904c determines that the new management IP address is not associated with the networking device 904 such that applying that new management IP address will prevent communications between the management IHS 902 and the networking device 904, the method 1000 may proceed to block 1010, discussed in further detail below. In some examples, the determination by the lockout prevention engine 904c of whether communications will be inhibited may involve an analysis of the new management IP address with regard to management IP addresses that allow communication with the networking device 904. In other example, the determination by the lockout prevention engine 904c of whether communications will be inhibited may involve reviewing previous configuration instructions and configuration results stored in the lockout prevention database 904d (discussed in further detail below) to determine whether the application of the new management IP address or similar management IP addresses has previously resulted in inhibited communications with the networking device 904 or similar networking devices.

In another embodiment, the management data traffic may include a configuration instruction that provides for the shutting down of the communication port 904a on the networking device 904 to which the management IHS 902 is coupled such that the network device 904 is no longer reachable through that communication port 904a (e.g., in order to perform a configuration validation procedure on the networking device 904 as discussed above). For example, the user of the management IHS 902 may wish to validate the configuration of the networking device 904, which may include configuring the communication port 904a through which the management IHS 902 accesses the networking device 904. One of skill in the art will recognize that the application of such a configuration instruction will shut down the communication port 904a that the management IHS 902 uses to access the networking device 904, and as a result the management IHS 902 will no longer be able to communicate with the networking device 904. Conventional solutions following the application of such configuration instructions typically require that the user have someone directly connect to the networking device 904 in order to re-activate the communications port 904a such that the management IHS 902 will once again be able to communicate with the networking device 904.

At decision block 1004, the lockout prevention engine 904c may receive the configuration instruction that provides for the shutting down of the communication port 904a on the networking device 904 and make a determination of whether application of the configuration instruction to shut down the communication port 904a the networking device 904 will inhibit communications between the management IHS 902 and the networking device 904. If the lockout prevention engine 904c determines that shutting down the communication port 904a on the networking device 904 will still allow communications between the management IHS 902 and the networking device 904 (e.g., the management IHS 902 may be connected to another communication port 904a that will not be shut down upon application of the configuration instruction), the method 1000 may proceed to block 1006, discussed in further detail below. If the lockout prevention engine 904c determines that shutting down the communication port 904a on the networking device 904 will prevent communications between the management IHS 902 and the networking device 904 (e.g., the management IHS 902 is only connected to the communication port 904a that will be shut down upon application of the configuration instruction), the method 1000 may proceed to block 1010, discussed in further detail below. In some examples, the determination by the lockout prevention engine 904c of whether communications will be inhibited may involve an analysis of the communication port 904a on the networking device 904 through which the configuration instruction was received, other possible communication ports 904a on the networking device 904 that the management IHS 902 may be coupled to, and/or any other information relevant to the continued communication between the management IHS 902 and the management engine 904b/networking device 904. In other example, the determination by the lockout prevention engine 904c of whether communications will be inhibited may involve reviewing previous configuration instructions and configuration results stored in the lockout prevention database 904d (discussed in further detail below) to determine whether the shutting down of the communication port 904a has previously resulted in inhibited communications with the networking device 904 or similar networking devices.

In another embodiment, the management data traffic/control plane traffic may include a configuration instruction that provides for the aggregation of the communication port 904a on the networking device 904 to which the management IHS 902 is coupled with other communication ports on the networking device 904 such that communication between the management IHS 902 and the network device 904 through that communication port 904*a* is affected (e.g., because the communication port 904*a* to which the management IHS 902 is coupled is part of a LAG with other communication ports 904*a* that the management IHS 902 is not coupled to). For example, the user of the management IHS 902 may wish to aggregate a plurality of communication ports 904*a* on the networking device 904, and may select the communication port 904*a* through which the management IHS 902 accesses the networking device 904 as part of a LAG. One of skill in the art will recognize that the application of such a configuration instruction to the communication port 904*a* that the management IHS 902 uses to access the networking device 904 when the management IHS 902 is not coupled to the networking device 904 by the other communication ports 904*a* in the LAG may inhibit the communications between the management IHS 902 and the networking device 904.

At decision block 1004, the lockout prevention engine 904*c* may receive the configuration instruction that provides for the aggregation of the communication port 904*a* on the networking device 904 and make a determination of whether application of the configuration instruction to aggregate the communication port 904*a* the networking device 904 will inhibit communications between the management IHS 902 and the networking device 904. If the lockout prevention engine 904*c* determines that aggregating the communication port 904*a* on the networking device 904 will still allow full communications between the management IHS 902 and the networking device 904 (e.g., the management IHS 902 is coupled to the networking device 904 by all the communication ports being aggregated), the method 1000 may proceed to block 1006, discussed in further detail below. If the lockout prevention engine 904*c* determines that aggregating the communication port 904*a* on the networking device 904 will slow down or otherwise inhibit communications between the management IHS 902 and the networking device 904 (e.g., the management IHS 902 is not coupled to the networking device 904 by all the communication ports being aggregated), the method 1000 may proceed to block 1010, discussed in further detail below. In some examples, the determination by the lockout prevention engine 904*c* of whether communications will be inhibited may involve an analysis of the communication port 904*a* on the networking device 904 through which the configuration instruction was received, other possible communication ports 904*a* on the networking device 904 that the management IHS 902 may be coupled to, and/or any other information relevant to the continued communication between the management IHS 902 and the management engine 904*b*/networking device 904. In other example, the determination by the lockout prevention engine 904*c* of whether communications will be inhibited may involve reviewing previous configuration instructions and configuration results stored in the lockout prevention database 904*d* (discussed in further detail below) to determine whether the aggregation of the communication port 904*a* has previously resulted in inhibited communications with the networking device 904 or similar networking devices.

Thus, the lockout prevention engine 904*c* operates at decision block 1004 to determine whether the application of one or more configuration instructions will inhibit communications between the management IHS 902 and the management engine 904*b*/networking device 904 by performing either or both of an "on-the-fly" or real-time analysis of the received configuration instruction(s) and communication configuration of the management IHS 902 with the networking device 904, and a lookup in an "experiential" database of previous configuration instructions and respective configuration results (e.g., by comparing the received configuration instruction to a plurality of a previous configuration instructions and respective configuration results associated with the previous configuration instructions and, in response, determining that at least one of the previous configuration instructions matches the received configuration instruction and is associated with a respective configuration result that inhibited communications). In different embodiments, the real-time analysis of the received configuration instruction(s) and communication configuration of the management IHS 902 allows for the immediate detection of configuration instructions that will logically result in inhibited communications between the management IHS 902 and the networking device 904, while the use of the "experiential" database of previous configuration instructions and respective configuration results allows for the determination of logically allowable configurations (e.g., a LAG including the communication port 904*a* being used to access the networking device 904) that have been found to previously inhibit communications between the management IHS 902 and the networking device 904. In addition to configuration instructions and associated configuration results, "experiential" databases according to the teachings of the present disclosure may be populated using information for Information Technology (IT) professionals, customer support data, cognitive modeling techniques, artificial intelligence, knowledge bases, existing error databases, and/or a variety of other configuration issue sources known in the art. As discussed above, a wide variety of other configuration instructions that inhibit communications or otherwise cause negative affects to the system will fall within the scope of the present disclosure including, for example, the management IHS 902 issuing a communication port 904*a* on the networking device 904 an IP address that will duplicate traffic on the network.

If, at decision block 1004, it is determined that the application of the configuration instruction will not inhibit communications, the method 1000 proceeds to block 1006 where the configuration instruction is applied to produce a configuration result. In an embodiment, the lockout prevention engine 904*c* may inform the management engine 904*b* that the application of the configuration instruction(s) received in the management data traffic will not inhibit communications and, in response, the management engine 904*b* may operate to apply the configuration instructions to the networking device 904, the communication ports 904*a*, and/or to any subsystem in the networking device 904 to which the configuration instruction(s) apply. Using the examples provided above, the management engine 904*b* may change a management IP address associated with the networking device 904, shut down one or more communication ports 904*a* on the networking device 904 and/or perform any other configuration validation preparation operations on the networking device 904 known in the art, or aggregate a plurality of communication ports 904*a* on the networking device and/or perform any other aggregation preparation operations on the networking device 904 known in the art. Such applications of the configuration instruction(s) will product configuration results such as providing a new management IP address for the networking device 904, shutting down one or more communication ports 904*a* on the networking device 904, and aggregating a plurality of the communication ports 904*a* on the networking device 904. In addition, the configuration results produces at block 1006 may include any of a variety of actions by the management IHS 902 and/or the networking device 904 subsequent to application of the configuration instruction(s), including subsequent communications and/or attempted communications between the management IHS 902 and the networking device 904, commands provided on the management IHS 902 and the networking device 904, and/or any other IHS actions known in the art.

The method 1000 then proceeds to block 1008 where the configuration instruction and configuration results are stored in a database. In an embodiment, subsequent to applying the configuration instruction to produce the configuration result, the management engine 904b provides the applied configuration instruction and information about any associated configuration results to the lockout prevention engine 904c, and the lockout prevention engine 904c stores the applied configuration instruction and information about any associated configuration results in the lockout prevention database 904d. As such, each time one or more configuration instruction(s) are applied, the results of the application of the configuration instruction(s) are tracked and stored in the lockout prevention database 904d, which allows the lockout prevention database 904d to develop the "experiential" database discussed above that details the effects of the application of different configuration instructions on the networking device 904. Furthermore, "experiential" databases may be shared between networking devices and/or other types of devices to share the results of the application of configuration instructions to those devices, which allows for the building of an "experiential" database for multiple and/or different types of devices that have received different types of configuration instructions that have produced different types of configuration results. As discussed above, such "experiential" databases are helpful in detecting potential lockouts or otherwise inhibited communications due to the application of configuration instructions that are otherwise logically correct on the networking device 904 and would otherwise result in a determination that they will not inhibit communications at decision block 1004.

If, at decision block 1004, it is determined that the application of the configuration instruction will inhibit communications, the method 1000 proceeds to block 1010 where a warning message is provided to the management IHS. In an embodiment, the lockout prevention engine 904c may inform the management engine 904b that the application of the configuration instruction(s) received in the management data traffic will inhibit communications and, in response, the management engine 904b may operate to instruct the management IHS 902 to display a warning message. As discussed below, warning message provided in response to determining that the application of a configuration instruction may inhibit communications may have different levels that may depend on the severity of the inhibited communication. While 3 different severity levels are provided in the examples below, any number of severity levels may be utilized in providing the warning messages at block 1010 while remaining within the scope of the present disclosure.

Figure 13:
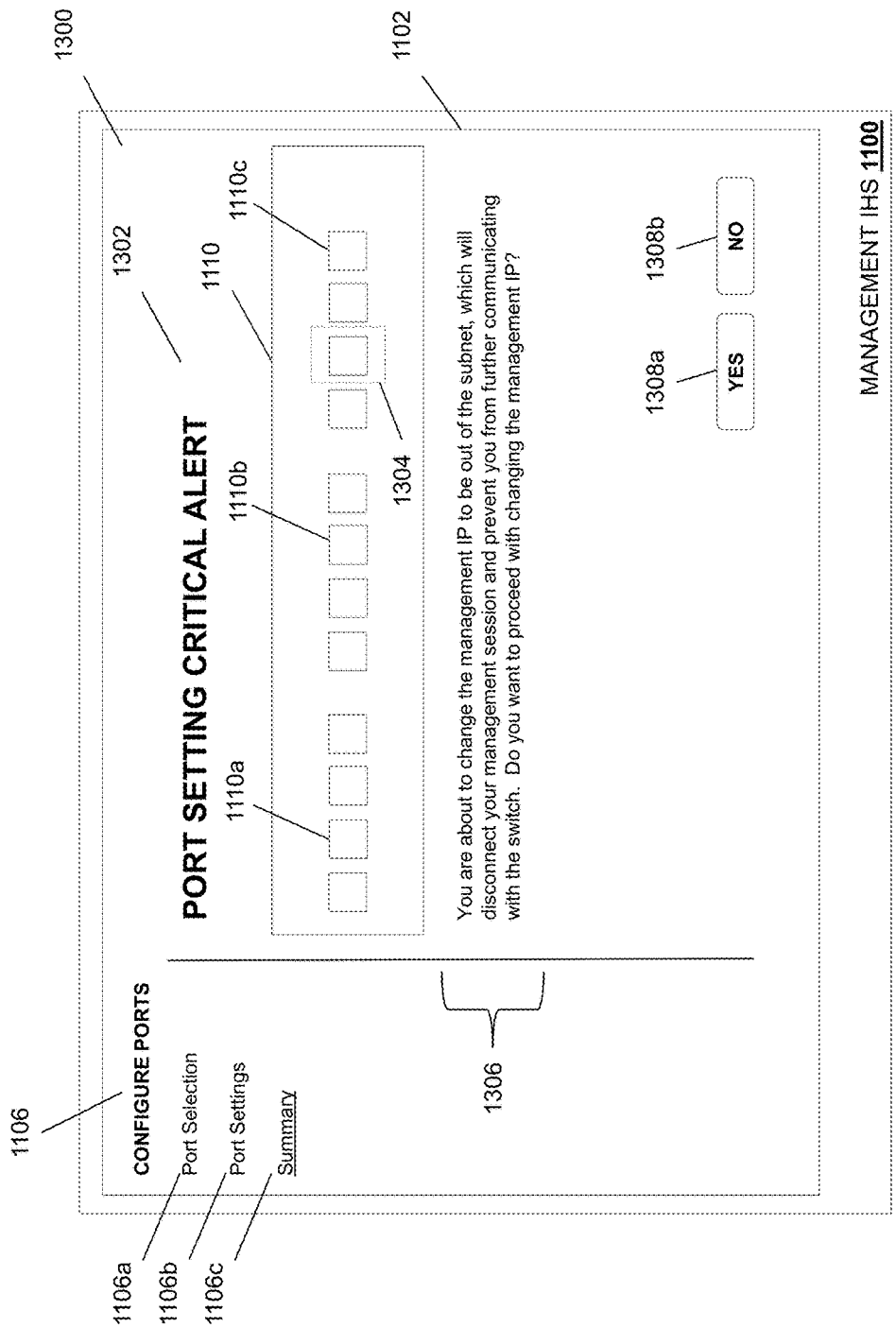
FIG. 13 is a screen shot view illustrating an embodiment of a management IHS displaying a lockout prevention critical message

Referring now to FIG. 13, the management IHS 1100 that was used to provide the port configuration screens in FIGS. 11 and 12 is illustrated displaying first level warning message screen 1300 that may be provided at block 1010 of the method 1000. The illustrated embodiment, the first level warning message screen 1300 provides the port configuration status bar 1106 that shows the status of the port configuration, discussed above, the networking device graphic 1110 with the port graphics 1110a, 1110b, and 1110c, and navigation buttons 1308a (e.g., a "yes" button) and 1308b (e.g., a "no" button). The first level warning message screen 1300 also includes a critical level alert 1302 that may be used to quickly indicate to the user of the management IHS 902/1100 that the requested settings will completely prevent any further communication between the management IHS 902/1100 and the networking device 904. The first level warning message screen 1300 also includes a port indictor graphic 1304 that indicates the port graphic 1110c on the networking device graphic 1110 that corresponds to the port 904a on the networking device 904 that will be responsible for the inhibited communications if the configuration instruction is applied (e.g., the port graphic 1110c for the port 904a that couples the management IHS 902 to the networking IHS 904). The first level warning message screen 1300 also includes inhibited communication information 1306 that, in the illustrated embodiment, informs the user that they are about to change the management IP address of the networking device 904 to a different subnet such that their management session will be disconnected and future communication between the management IHS 1100 and the networking device 904 prevented, and asks the user whether they want to proceed with the selected configuration. While the changing of the management IP address of the networking device 904 to a different subnet is illustrated and described herein as resulting in a critical alert that future communications will be prevented, one of skill in the art will recognize that the changing of a management IP address of the networking device 904 (e.g., to a management IP that is already being used in the subnet) may result in a warning alert or informational alert that doing so will duplicate traffic or cause traffic to be lost.

Figure 14:
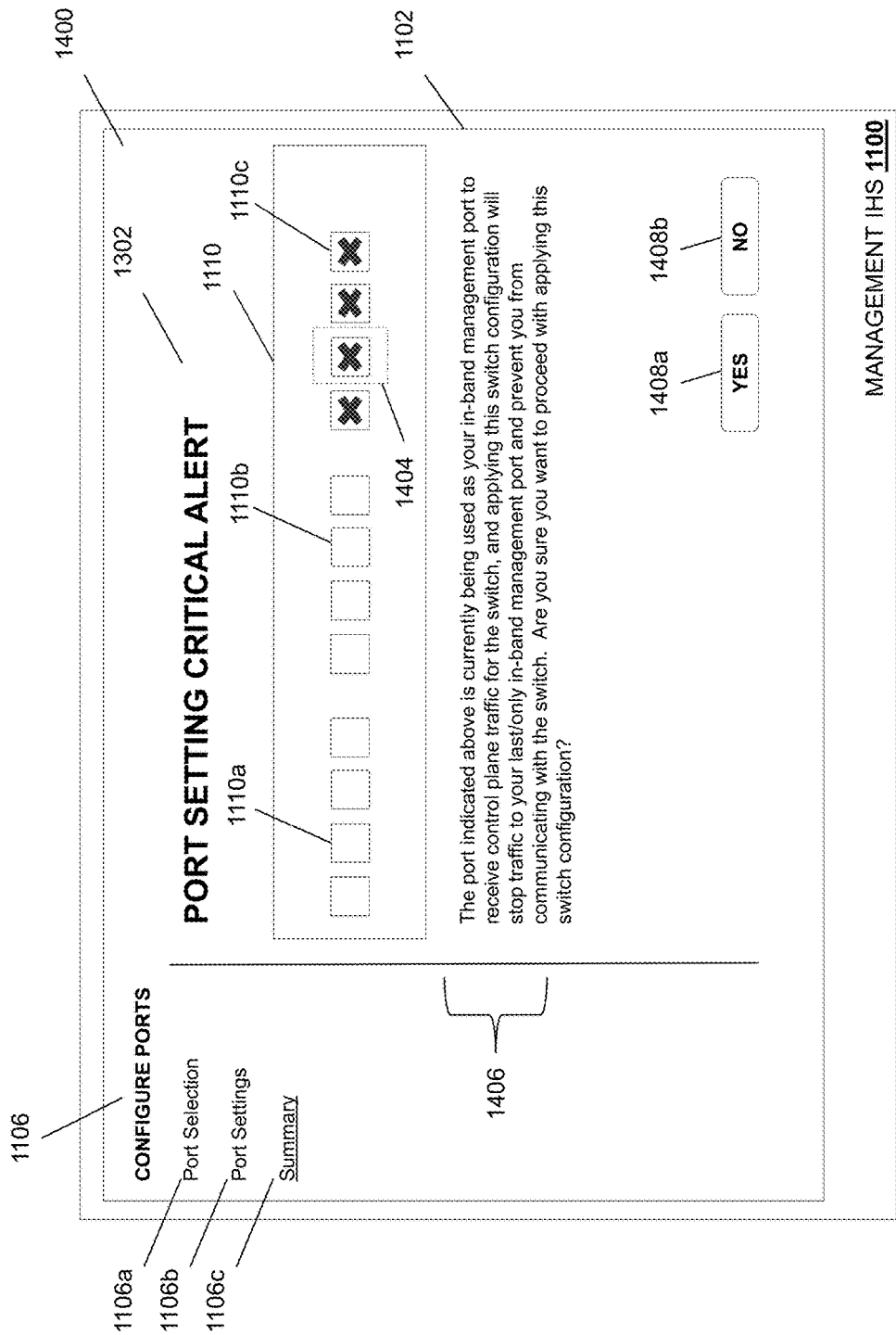
FIG. 14 is a screen shot view illustrating an embodiment of a management IHS displaying a lockout prevention critical message.

Referring now to FIG. 14, the management IHS 1100 that was used to provide the port configuration screens in FIGS. 11 and 12 is illustrated displaying first level warning message screen 1400 that may be provided at block 1010 of the method 1000. The illustrated embodiment, the first level warning message screen 1400 provides the port configuration status bar 1106 that shows the status of the port configuration, discussed above, the networking device graphic 1110 with the port graphics 1110a, 1110b, and 1110c including the selected port graphics 1110c, and navigation buttons 1408a (e.g., a "yes" button) and 1408b (e.g., a "no" button). The first level warning message screen 1400 also includes a critical level alert 1402 that may be used to quickly indicate to the user of the management IHS 902/1100 that the requested settings will completely prevent any further communication between the management IHS 902/1100 and the networking device 904. The first level warning message screen 1400 also includes a port indictor graphic 1404 that indicates the port graphic 1110c on the networking device graphic 1110 that corresponds to the port 904a on the networking device 904 that will be responsible for the inhibited communications if the configuration instruction is applied (e.g., the port graphic 1110c for the port 904a that couples the management IHS 902 to the networking IHS 904). The first level warning message screen 1400 also includes inhibited communication information 1406 that, in the illustrated embodiment, informs the user that the selected port graphic 1110c indicated by the port indicator graphic 1404 is being used to receive management data traffic and the selected configuration of that port will prevent further communication with the networking device 904, and asks the user whether they want to proceed with the selected configuration.

Figure 15:
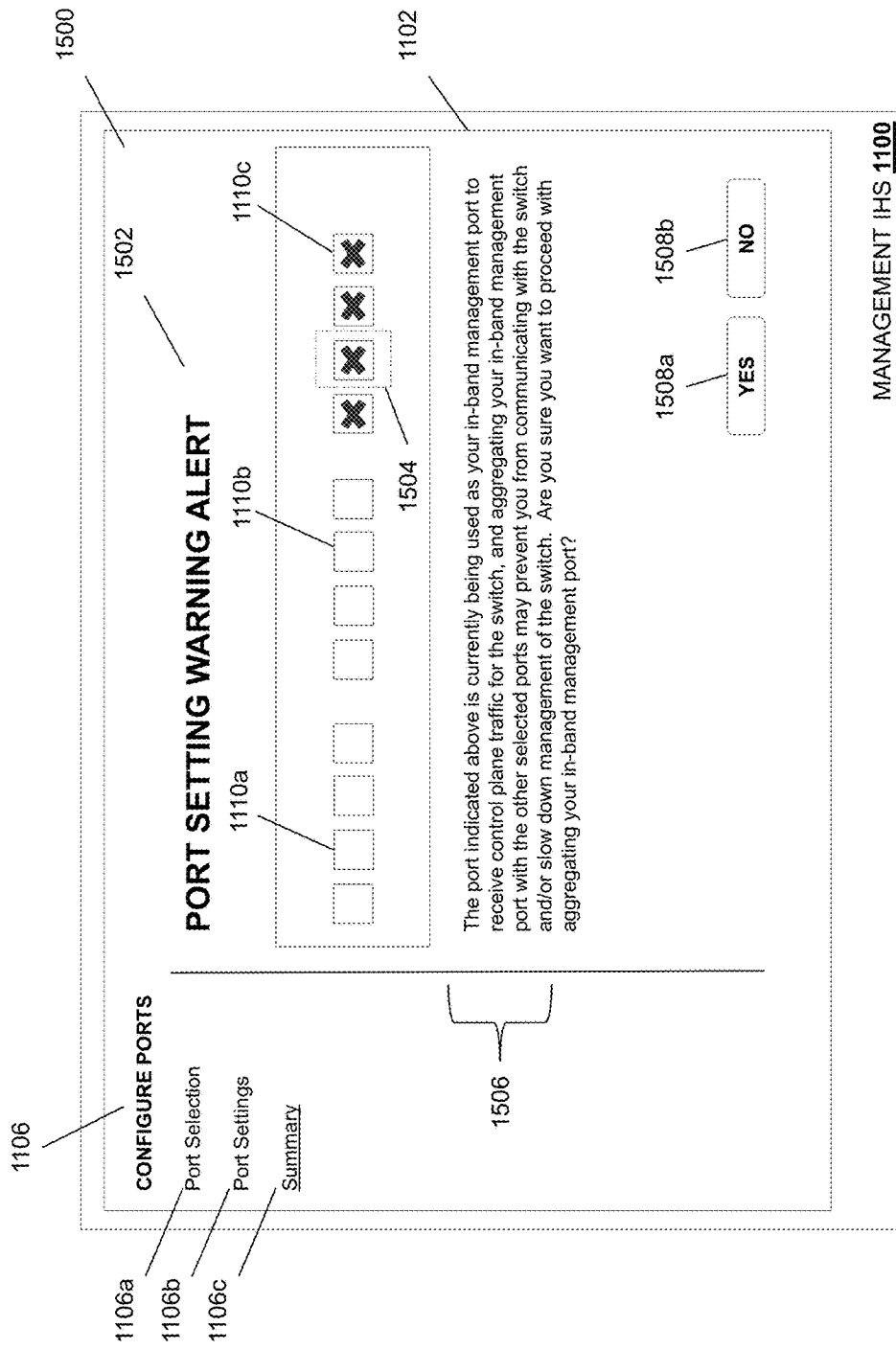
FIG. 15 is a screen shot view illustrating an embodiment of a management IHS displaying a lockout prevention warning message.

Referring now to FIG. 15, the management IHS 1100 that was used to provide the port configuration screens in FIGS.

11 and 12 is illustrated displaying second level warning message screen 1500 that may be provided at block 1010 of the method 1000. The illustrated embodiment, the second level warning message screen 1500 provides the port configuration status bar 1106 that shows the status of the port configuration, discussed above, the networking device graphic 1110 with the port graphics 1110a, 1110b, and 1110c including the selected port graphics 1110c, and navigation buttons 1508a (e.g., a "yes" button) and 1508b (e.g., a "no" button). The second level warning message screen 1500 also includes a warning level alert 1502 that may be used to quickly indicate to the user of the management IHS 902/1100 that the requested settings may prevent any further communication between the management IHS 902/1100 and the networking device 904. The second level warning message screen 1500 also includes a port indictor graphic 1504 that indicates the port graphic 1110c on the networking device graphic 1110 corresponding to the port 904a on the networking device 904 that may be responsible for the inhibited communications if the configuration instruction is applied (e.g., the port graphic 1110c for the port 904a that couples the management IHS 902 to the networking IHS 904). The second level warning message screen 1500 also includes inhibited communication information 1406 that, in the illustrated embodiment, informs the user that the selected port graphic 1110c indicated by the port indicator graphic 1504 is being used to receive management data traffic and the selected configuration of that port may prevent further communication with the networking device 904, and asks the user whether they want to proceed with the selected configuration.

Figure 16:
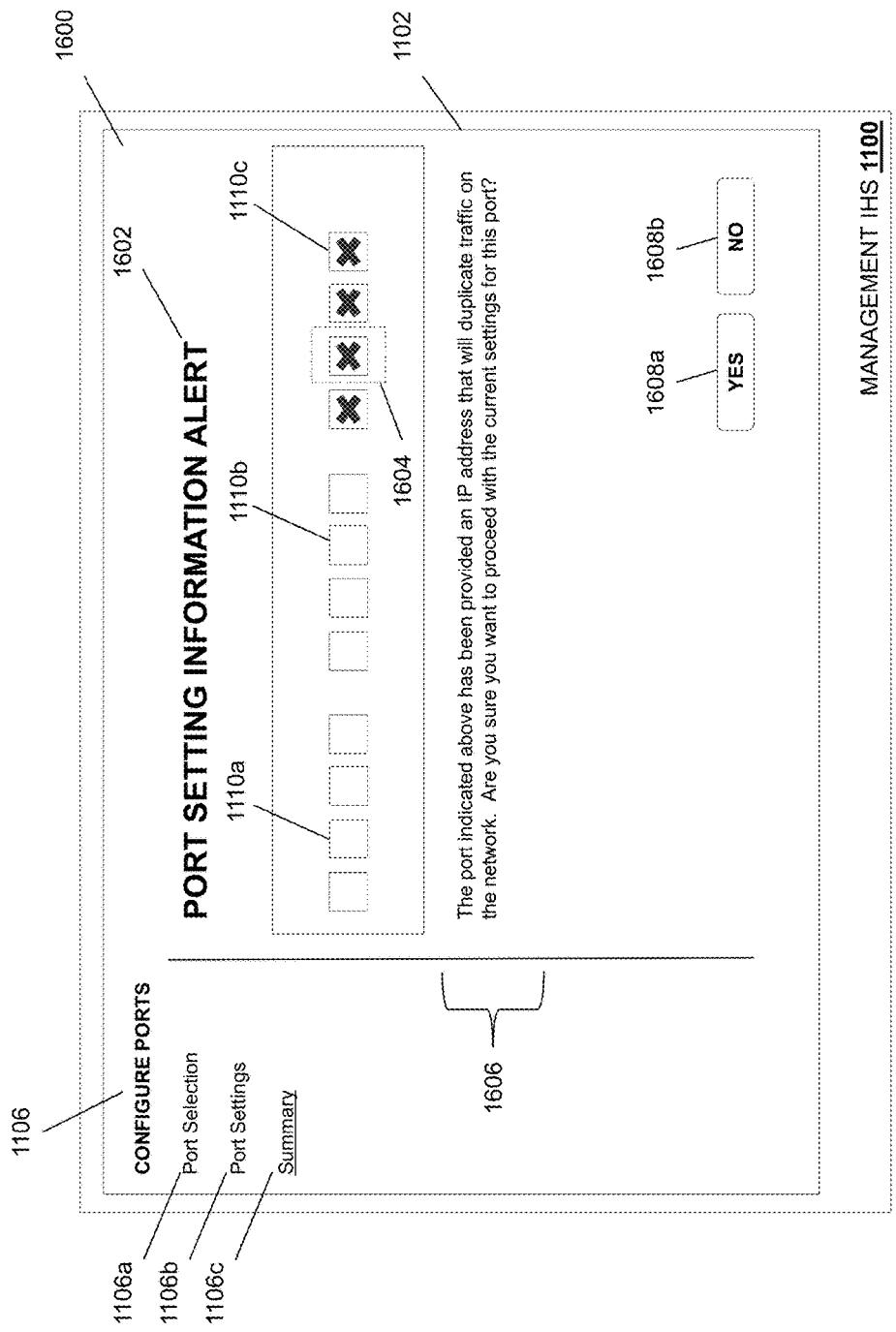
FIG. 16 is a screen shot view illustrating an embodiment of a management IHS displaying a lockout prevention information message.
Figure 17:
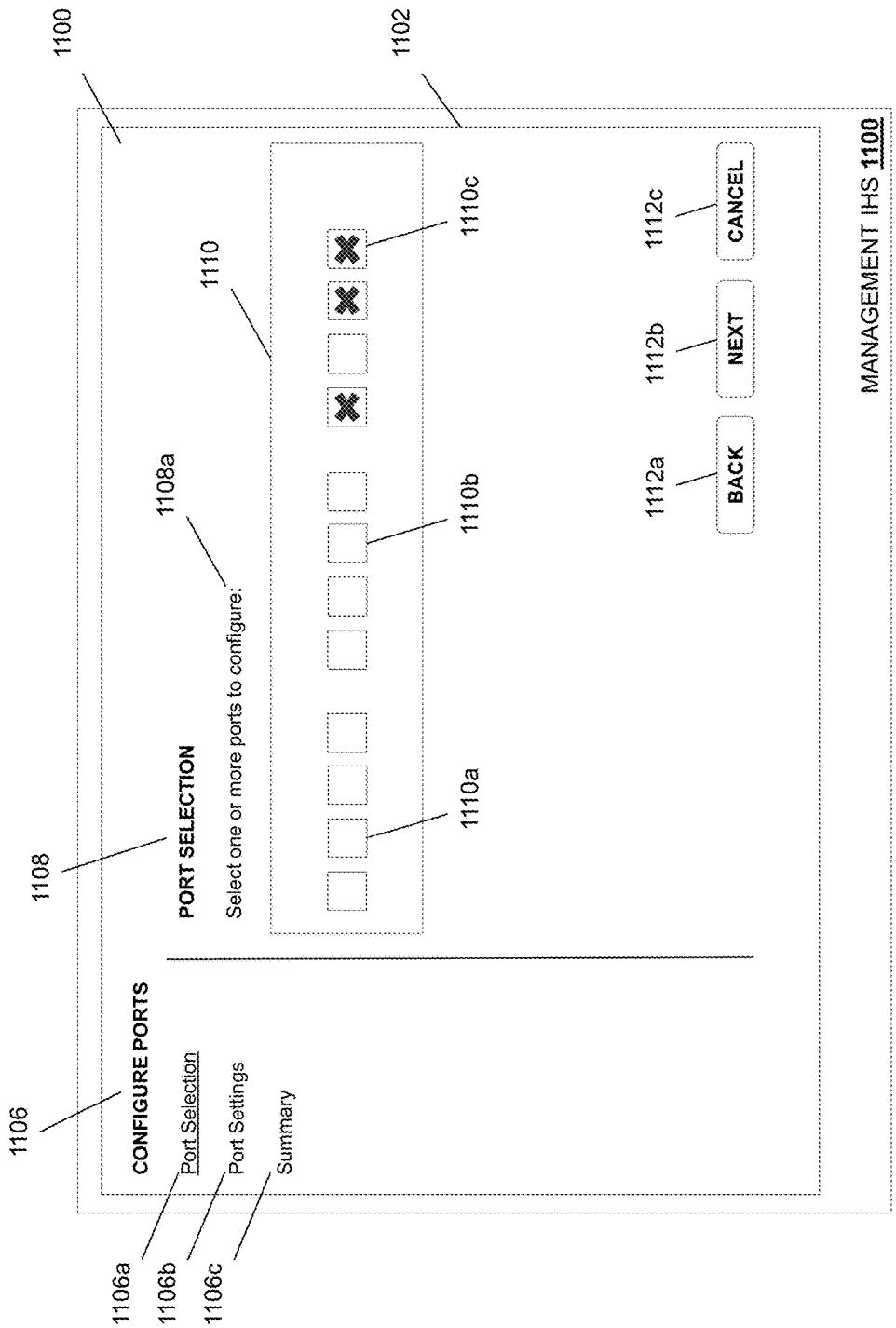
FIG. 17 is a screen shot view illustrating an embodiment of a management IHS being used to remove a selected network interface from being configured.

Referring now to FIG. 16, the management IHS 1100 that was used to provide the port configuration screens in FIGS. 11 and 12 is illustrated displaying third level warning message screen 1600 that may be provided at block 1010 of the method 1000. The illustrated embodiment, the third level warning message screen 1600 provides the port configuration status bar 1106 that shows the status of the port configuration, discussed above, the networking device graphic 1110 with the port graphics 1110a, 1110b, and 1110c including the selected port graphics 1110c, and navigation buttons 1608a (e.g., a "yes" button) and 1608b (e.g., a "no" button). The third level warning message screen 1600 also includes an information level alert 1602 that may be used to quickly indicate to the user of the management IHS 902/1100 that the requested settings may produce some negative consequences for the management IHS 902/1100, the networking device 904, and/or the network 906. The third level warning message screen 1600 also includes a port indictor graphic 1604 that indicates the port graphic 1110c on the networking device graphic 1110 corresponding to the port 904a on the networking device 904 that may be responsible for the inhibited communications if the configuration instruction is applied (e.g., the port graphic 1110c for the port 904a that couples the management IHS 902 to the networking IHS 904). The third level warning message screen 1600 also includes inhibited communication information 1606 that, in the illustrated embodiment, informs the user that the selected port graphic 1110c indicated by the port indicator graphic 1604 is being provided an IP address that will duplicate traffic on the network 906, and asks the user whether they want to proceed with the selected configuration.

Thus, prior to applying any configuration instructions received in management data traffic/control plane traffic, the networking device 204 may analyze those configuration instructions to determine whether they will inhibit communications between the management IHS 902 and the networking device 904 and, if so, instruct the management IHS 902 to provide a warning message to the user so that the user may determine whether they would like to proceed with the application of those configuration instructions. As discussed above, the networking device 904 may analyze the configuration instructions and connections with the management IHS 902, and/or use the "experiential" database, to determine whether a wide variety of configuration instructions may inhibit communications in a wide variety of manners, and then warn the user of those possible inhibited communications in a wide variety of ways that will fall within the scope of the present disclosure.

The method 1000 then proceeds to decision block 1012 where it is determined whether a command is received to apply the configuration instruction. In an embodiment, subsequent to providing the first level warning message screen 1400, the second level warning message screen 1500, or the third level warning message screen 1600, the management engine 904b may receive a command from the management IHS 902 to apply the configuration instruction(s) in response to the user of the management IHS 902 selecting the navigation button 1408a, 15408a, or 1608a (the "yes" button). In response to receiving the command to apply the configuration instruction(s), the method 1000 proceeds to blocks 1006 and 1008 where the configuration instruction is applied to produce the configuration results, and the configuration instruction and configuration results are stored in the lockout prevention database 904d substantially as discussed above. As such, in embodiments where the warning message is provided to the user of the management IHS 902 at block 1010 and the user disregards the warning message and chooses the apply the configuration instruction(s) anyways, the configuration results are added to "experiential" database that details the effects of the application of different configuration instructions on the networking device 904. Thus, the "experiential" database may be periodically updated with configuration results for configuration instructions that the system has determined will inhibit communications when the user decides to apply those configuration instructions despite warning messages from the system.

In another embodiment, subsequent to providing the first level warning message screen 1400, the second level warning message screen 1500, or the third level warning message screen 1600, the management engine 904b may receive a command from the management IHS 902 to not apply the configuration instruction(s) in response to the user of the management IHS 902 selecting the navigation button 1408b, 1508b, or 1608b (the "no" button). In response to receiving the command to not apply the configuration instruction(s), the method 1000 proceeds to block 1014 where the management IHS is instructed to provide a configuration modification screen. FIG. 16 illustrates the management IHS 1100 displaying the first port configuration screen 1100 on the display device 1102, which is provided to the user on the management IHS 902/1100 to allow the user to modify the configuration instructions being provided to the networking device 904. The first port configuration screen 1100 includes the port configuration status bar 1106 that shows the status of the port configuration, discussed above. In the illustrated embodiment, the first port configuration screen 1100 is providing for the modification of the previously provided ports settings in the port selection section 1108 that includes the port selection instruction 1108a that instructs the user to select the ports for configuration, the networking device graphic 1110 with the port graphics 1110a, 1110b, and 1110c including the previously selected port graphics 1110c, and the navigation buttons 1112a (e.g., the "back" button), 1112b (the "next" button) and 1112c (the "cancel" button). In the illustrated embodiment, the user has de-selected the one of the port graphics 1110c on the networking device graphic 1110 that corresponds to the communication port 904a that connects the management IHS 902 to the networking device 904 and that was indicated by the port indicator graphics 1404, 1504, and 1604 on the first level warning message screen 1400, the second level warning message screen 1500, or the third level warning message screen 1600, respectively. Upon deselecting the port graphic 1110c that corresponds to the communication port 904a that connects the management IHS 902 to the networking device 904 and selecting the navigation button 1112b (e.g., the "next" button), the method 1000 may proceed back to block 1102 and then proceed as discussed above.

In different embodiments, the lockout prevention engine 904c and/or the management engine 904b may operate to suggest modifications to the management data traffic/control plane traffic and/or configuration instructions that will prevent the inhibition of any communications between the management IHS 902 and the networking device 904 that were detected at block 1104. For example, rather than just identifying the communication port 904a on the networking device 904 that should not be subject to the configuration instruction (e.g., via the port indicator graphics 1404, 1504, and 1604) as illustrated and described above, the lockout prevention engine 904c and/or the management engine 904b may determine one or more modifications to the management data traffic/control plane traffic and/or configuration instructions (e.g., using the example of changing the management IP address associated with the networking device 904 discussed above, by determining a proper management IP address that will allow the management IHS 902 to subsequently communicate with the networking device 904) and provide those modifications for display on the first level warning message screen 1400, the second level warning message screen 1500, or the third level warning message screen 1600. Modifications to the management data traffic/control plane traffic and/or configuration instructions may be determined by analyzing the configuration instructions and/or connections between the management IHS 902 and the networking device 904 and/or using the "experiential" database discussed above to determine what modifications will operate to prevent the inhibition of communications.

Thus, systems and methods have been described that provide for the analysis of a configuration instruction, the network interface to which is will be applied, and the management IHS that is connected to that network interface, prior to the application of that configuration instruction to a managed IHS in order to determine whether the application of that configuration instruction will inhibit the communications of the management IHS that is connected to the managed IHS through that network interface. When a user attempts to configure a network interface in a manner that will inhibit communications from management IHS to that managed IHS, the systems and methods of the present disclosure will warn that user so that the user can modify the configuration instruction to ensure that their management IHS will continue to be able to communicate with that managed IHS. Such systems and methods save time, reduce losses in productivity, and prevent embarrassment for users that otherwise might incorrectly configure a network interface and subsequently lock themselves out of that managed IHS such that they require help to regain access Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A lockout prevention system, comprising:
   a network;
   a management Information Handling System (IHS) that is coupled to the network; and
   a networking device that includes a network interface that is communicatively connected to the management IHS through the network, wherein the networking device is configured to:
   receive a configuration instruction through the network interface from the management IHS;
   determine, without applying the configuration instructions to the networking device, that the application of the configuration instruction to the networking device will inhibit the communication between the management IHS and the networking device through the network interface; and
   provide a warning message for display on the management IHS in response to determining that the application of the configuration instruction will inhibit the communication between the management IHS and the networking device through the network interface.

2. The lockout prevent system of claim 1, wherein the determining that the application of the configuration instruction to the network interface will inhibit the communication between the management IHS and the networking device through the network interface further includes:
   determining that the configuration instruction includes an instruction to change a management address associated with the networking device that will prevent the communication between the management IHS and the networking device.

3. The lockout prevent system of claim 1, wherein the determining that the application of the configuration instruction to the network interface will inhibit the communication between the management IHS and the networking device through the network interface further includes:
   determining that the configuration instruction includes an instruction to shut down the network interface that will prevent the communication between the management IHS and the networking device.

4. The lockout prevent system of claim 1, wherein the determining that the application of the configuration instruction to the network interface will inhibit the communication between the management IHS and the networking device through the network interface further includes:
   determining that the configuration instruction includes an instruction to aggregate the network interface with at least one other network interface on the networking device.

5. The lockout prevent system of claim 1, wherein the determining that the application of the configuration instruction to the network interface will inhibit the communication between the management IHS and the networking device through the network interface further includes:
   comparing the received configuration instruction to a plurality of a previous configuration instructions and respective configuration results associated with the previous configuration instructions and, in response, determining that at least one of the previous configuration instructions matches the received configuration instruction and is associated with a respective configuration result that inhibited communications.

6. The lockout prevent system of claim 1, wherein networking device is further configured to:
   detect management data traffic that is received over the network interface from the management IHS, wherein the configuration instruction is included in the management data traffic and associated with the network interface due to the management data traffic being received through the network interface.

7. An information handling system (IHS), comprising:
   a communication port;
   a processing system that is coupled to the communication port;
   a memory system that is coupled to the processing system and that includes instruction that, when executed by the processing system, cause the processing system to provide a lockout prevention engine that is configured to:
      receive a configuration instruction through the communication port from a management IHS;
      determine, without applying the configuration instructions, that the application of the configuration instruction will inhibit communications from the management IHS and through the communication port; and
      provide a warning message for display on the management IHS in response to determining that the application of the configuration instruction will inhibit communications from the management IHS and through the communication port.

8. The IHS of claim 7, wherein the determining that the application of the configuration instruction will inhibit communications from the management IHS and through the communication port further includes:
   determining that the configuration instruction includes an instruction to change a management address associated with the IHS that will prevent communications from the management IHS and through the communication port.

9. The IHS of claim 7, wherein the determining that the application of the configuration instruction will inhibit communications from the management IHS and through the communication port further includes:
   determining that the configuration instruction includes an instruction to shut down the communication port that will prevent communications from the management IHS and through the communication port.

10. The IHS of claim 7, wherein the determining that the application of the configuration instruction will inhibit communications from the management IHS and through the communication port further includes:
    determining that the configuration instruction includes an instruction to aggregate the communication port with at least one other communication port.

11. The IHS of claim 7, wherein lockout prevention engine is further configured to:
    receive a plurality of a previous configuration instructions;
    determine a respective configuration result associated with each of the plurality of previous configuration instructions, wherein at least one of the respective configuration results inhibits communications; and
    storing the plurality of previous configuration instructions and respective configuration results in a database.

12. The IHS of claim 11, wherein lockout prevention engine is further configured to:
    compare the received configuration instruction to the plurality of a previous configuration instructions and respective configuration results stored in the database and, in response, determine that at least one of the previous configuration instructions matches the received configuration instruction and is associated with a respective configuration result that inhibited communications.

13. The IHS of claim 7, wherein lockout prevention engine is further configured to:
    detect management data traffic that is received through the communication port from the management IHS, wherein the configuration instruction is included in the management data traffic and associated with the communication port due to the management data traffic being received through the communication port.

14. A method for providing access control lists, comprising:
    receiving, by a networking device through a network interface from a management IHS, a configuration instruction;
    determining, by the networking device without applying the configuration instruction to the networking device, that the application of the configuration instruction to the networking device will inhibit the communication between the management IHS and the networking device through the network interface; and
    providing, by the networking device through the network interface to the management IHS, a warning message for display on the management IHS in response to determining that the application of the configuration instruction will inhibit the communication between the management IHS and the networking device through the network interface.

15. The method of claim 14, wherein the determining that the application of the configuration instruction to the network interface will inhibit the communication between the management IHS and the networking device through the network interface further includes:
    determining, by the networking device, that the configuration instruction includes an instruction to change a management address associated with the networking device that will prevent the communication between the management IHS and the networking device.

16. The method of claim 14, wherein the determining that the application of the configuration instruction to the network interface will inhibit the communication between the management IHS and the networking device through the network interface further includes:
    determining, by the networking device, that the configuration instruction includes an instruction to shut down the network interface that will prevent the communication between the management IHS and the networking device.

17. The method of claim 14, wherein the determining that the application of the configuration instruction to the network interface will inhibit the communication between the management IHS and the networking device through the network interface further includes:
    determining, by the networking device, that the configuration instruction includes an instruction to aggregate the network interface with at least one other network interface on the networking device.

18. The method of claim 14, further comprising:
    detecting, by the networking device, management data traffic that is received over the network interface from the management IHS, wherein the configuration instruction is included in the management data traffic and associated with the network interface due to the management data traffic being received through the network interface.

19. The method of claim 14, further comprising:
receiving, by the networking device, a plurality of a previous configuration instructions;
determining, by the networking device, a respective configuration result associated with each of the plurality of previous configuration instructions, wherein at least one of the respective configuration results inhibits communications; and
storing, by the networking device in a database, the plurality of previous configuration instructions and respective configuration results.

20. The method of claim 19, further comprising:
comparing, by the networking device, the received configuration instruction to the plurality of a previous configuration instructions and respective configuration results stored in the database and, in response, determining that at least one of the previous configuration instructions matches the received configuration instruction and is associated with a respective configuration result that inhibited communications.

* * * * *